United States Patent
Lin et al.

(10) Patent No.: US 10,668,693 B2
(45) Date of Patent: Jun. 2, 2020

(54) COMPOSITE LIGHT BLOCKING SHEET, IMAGING LENS ASSEMBLY AND ELECTRONIC DEVICE

(71) Applicant: LARGAN PRECISION CO., LTD., Taichung (TW)

(72) Inventors: Cheng-Feng Lin, Taichung (TW); Ming-Ta Chou, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 365 days.

(21) Appl. No.: 15/456,749

(22) Filed: Mar. 13, 2017

(65) Prior Publication Data
US 2018/0134006 A1    May 17, 2018

Related U.S. Application Data

(60) Provisional application No. 62/422,123, filed on Nov. 15, 2016.

(51) Int. Cl.
| | |
|---|---|
| *B32B 7/12* | (2006.01) |
| *B32B 27/00* | (2006.01) |
| *G02B 7/02* | (2006.01) |
| *G02B 5/00* | (2006.01) |

(52) U.S. Cl.
CPC ............. *B32B 7/12* (2013.01); *B32B 27/00* (2013.01); *G02B 5/003* (2013.01); *G02B 7/021* (2013.01)

(58) Field of Classification Search
CPC .......... G02B 5/005; G02B 7/02; G02B 7/021; G02B 7/022; G02B 7/025; G02B 7/026; G02B 27/0018; G03B 9/02

USPC ........ 359/505, 507, 601, 708–718, 738–740, 359/819
See application file for complete search history.

(56) References Cited

U.S. PATENT DOCUMENTS

| | | | |
|---|---|---|---|
| 7,457,052 B2 * | 11/2008 | Hirata ............... | G02B 27/0018 359/738 |
| 8,496,338 B2 | 7/2013 | Ho et al. | |
| 8,498,068 B2 | 7/2013 | Yu et al. | |
| 8,503,114 B2 | 8/2013 | Lai et al. | |
| 8,570,673 B2 | 10/2013 | Lai et al. | |
| 9,288,367 B2 | 3/2016 | Hirata et al. | |

(Continued)

FOREIGN PATENT DOCUMENTS

JP          2018060098 A  *  4/2018  ............... G02B 7/02

*Primary Examiner* — Robert E. Tallman
(74) *Attorney, Agent, or Firm* — McClure, Qualey & Rodack, LLP

(57) ABSTRACT

A composite light blocking sheet includes a first surface layer, a second surface layer, an inside substrate layer and a central axis. The first surface layer has a first opening and a first outer surface connected to the first opening. The second surface layer has a second opening and a second outer surface connected to the second opening. The inside substrate layer has a substrate opening and is disposed between the first surface layer and the second surface layer and connects the first surface layer and the second surface layer. The central axis is coaxial with the first opening, the second opening and the substrate opening. More than 95% of the first outer surface has a first gloss being GU1, more than 95% of the second outer surface has a second gloss being GU2, and the first gloss GU1 and the second gloss GU2 satisfy specific conditions.

25 Claims, 28 Drawing Sheets

(56) References Cited

U.S. PATENT DOCUMENTS

| | | | |
|---|---|---|---|
| 2014/0016203 A1* | 1/2014 | Toshima | G02B 5/22 |
| | | | 359/599 |
| 2015/0146310 A1* | 5/2015 | Choi | G02B 7/021 |
| | | | 359/793 |
| 2015/0198779 A1* | 7/2015 | Cho | G02B 13/0035 |
| | | | 359/601 |
| 2015/0338612 A1* | 11/2015 | Yu | G02B 9/62 |
| | | | 359/713 |
| 2019/0227202 A1* | 7/2019 | Nagahama | G02B 7/02 |

* cited by examiner

COMPOSITE LIGHT BLOCKING SHEET, IMAGING LENS ASSEMBLY AND ELECTRONIC DEVICE

RELATED APPLICATIONS

This application claims priority to U.S. Provisional Application Ser. No. 62/422,123, filed Nov. 15, 2016, which is herein incorporated by reference.

BACKGROUND

Technical Field

The present disclosure relates to a composite light blocking sheet, an imaging lens assembly and an electronic device. More particularly, the present disclosure relates to a composite light blocking sheet for preventing an incorrect assembling which is applicable to an imaging lens assembly and an electronic device.

Description of Related Art

Recently, the portable devices, such as smart phone and pad, are developed rapidly and ubiquitous in the human life. The imaging lens assembly disposed therein is thus becomes growth industry. With the improvement of the technology, more and more demands for high qualities of imaging lens assembly come out. Therefore, in addition to improving the quality of imaging lens assembly in optical design field, the precision of manufacturing and assembling processes are needed to be improved too.

According to conventional imaging lens assemblies, a light blocking sheet is used to block unnecessary lights therein. The surface properties of the light blocking sheet are critical to the effect of suppressing stray lights. Accordingly, the surface properties of the light blocking sheet affect the image quality of the imaging lens assembly.

A structure of the conventional light blocking sheet can refer to FIG. 1A and FIG. 1B. FIG. 1A is a front schematic view of a conventional light blocking sheet 1. FIG. 1B is a partially cross-sectional view taken along line 1b-1b of the conventional light blocking sheet 1 in FIG. 1A. As shown in FIG. 1A and FIG. 1B, the light blocking sheet 1 is annular and has a three-layer structure. The three layers are a first surface layer L1, a second surface layer L2 and an Inside substrate layer L3, respectively. Each of the first surface layer L1, the second surface layer L2 and the inside substrate layer L3 has a circular inner hole (the reference numerals are omitted) corresponding to each other. In particular, the first surface layer L1 has a gloss, and the second surface layer L2 has a gloss as same as the gloss of the first surface layer L1. When the light blocking sheet 1 is applied to an imaging lens assembly (not shown in the figure), a specific stray light may occur under an intense light source. However, a correct side of the light blocking sheet 1 cannot be identified so that the specific stray light cannot be eliminated by adjusting the orientation of the light blocking sheet 1.

To sum up, how to improve the ability for identifying the correct side of the light blocking sheet so as to eliminate stray lights effectively has become one of the most important issues nowadays.

SUMMARY

According to one aspect of the present disclosure, a composite light blocking sheet includes a first surface layer, a second surface layer, an inside substrate layer and a central axis. The first surface layer has a first opening and a first outer surface connected to the first opening. The second surface layer has a second opening and a second outer surface connected to the second opening. The second opening is disposed corresponding to the first opening. The inside substrate layer is disposed between the first surface layer and the second surface layer and connects the first surface layer and the second surface layer. In addition, the inside substrate layer has a substrate opening corresponding to the first opening and the second opening. The central axis is coaxial with the first opening, the second opening and the substrate opening. More than 95% of the first outer surface has a first gloss being GU1, more than 95% of the second outer surface has a second gloss being GU2, the first gloss GU1 is different from the second gloss GU2, and the following conditions can be satisfied: 0%<GU1<1.8% and 2.0%<GU2<9.0%.

According to another aspect of the present disclosure, an imaging lens assembly can include a barrel, an optical lens set and the composite light blocking sheet as mentioned above. The optical lens set and the composite light blocking sheet can be disposed in the barrel.

According to yet another aspect of the present disclosure, an electronic device can include the abovementioned imaging lens assembly and an image sensor. The image sensor can be disposed on an image surface of the imaging lens assembly.

According to further another aspect of the present disclosure, a composite light blocking sheet includes a first surface layer, a second surface layer, an inside substrate layer and a central axis. The first surface layer has a first opening and a first outer surface connected to the first opening. The second surface layer has a second opening and a second outer surface connected to the second opening. The second opening is disposed corresponding to the first opening. The inside substrate layer is disposed between the first surface layer and the second surface layer and connects the first surface layer and the second surface layer. In addition, the inside substrate layer has a substrate opening corresponding to the first opening and the second opening. The central axis is coaxial with the first opening, the second opening and the substrate opening. More than 95% of the first outer surface has a first gloss being GU1, more than 95% of the second outer surface has a second gloss being GU2, the first gloss GU1 is different from the second gloss GU2, and the following condition can be satisfied: 2.0<GU2/GU1<18.0.

According to still another aspect of the present disclosure, an imaging lens assembly can include a barrel, an optical lens set and the composite light blocking sheet as mentioned above. The optical lens set and the composite light blocking sheet can be disposed in the barrel.

According to yet another aspect of the present disclosure, an electronic device can include the abovementioned imaging lens assembly and an image sensor. The image sensor can be disposed on an image surface of the imaging lens assembly.

BRIEF DESCRIPTION OF THE DRAWINGS

The present disclosure can be more fully understood by reading the following detailed description of the embodiment, with reference made to the accompanying drawings as follows.

DETAILED DESCRIPTION

Composite Light Blocking Sheet

Figure 1A:
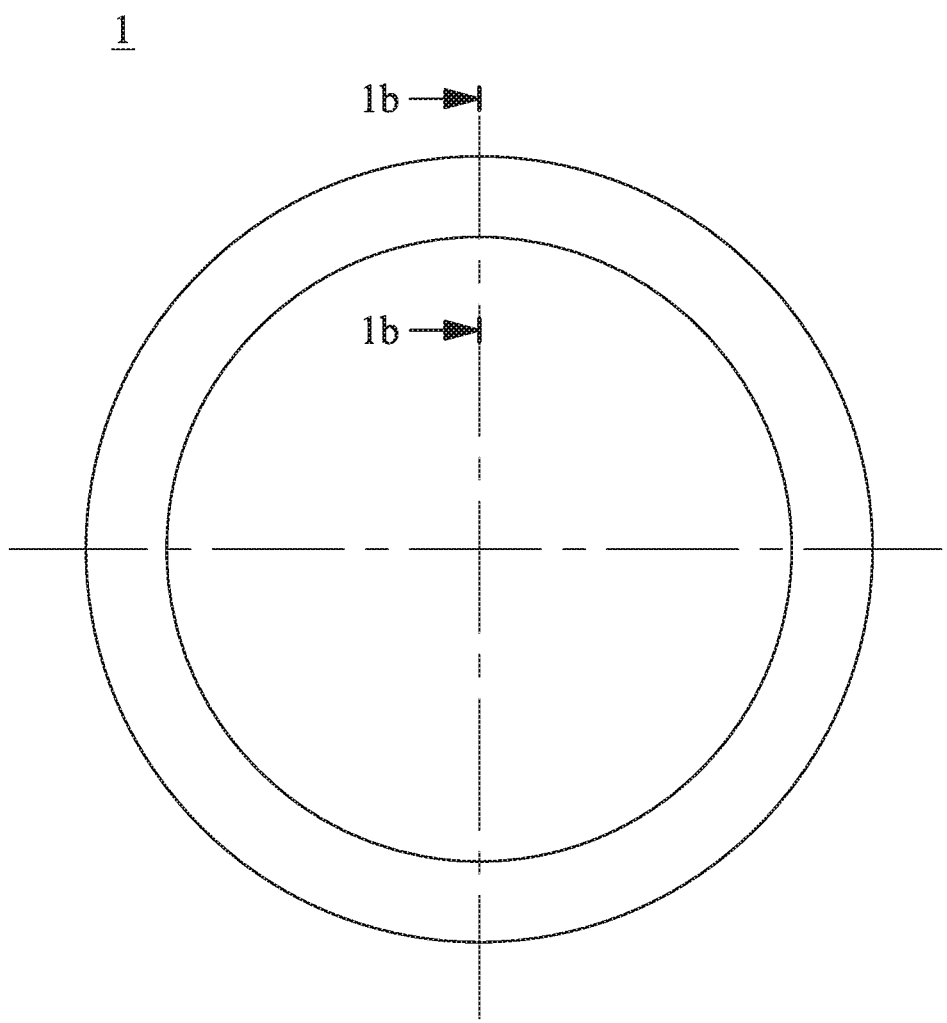
FIG. 1A is a front schematic view of a conventional light blocking sheet.
Figure 1B:
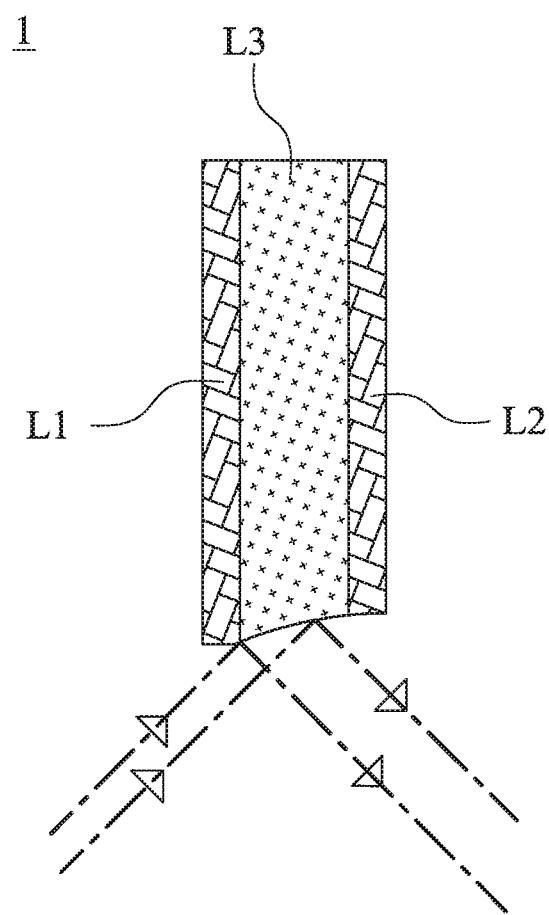
FIG. 1B is a partially cross-sectional view taken along line 1b-1b of the light blocking sheet in FIG. 1A.
Figure 2A:
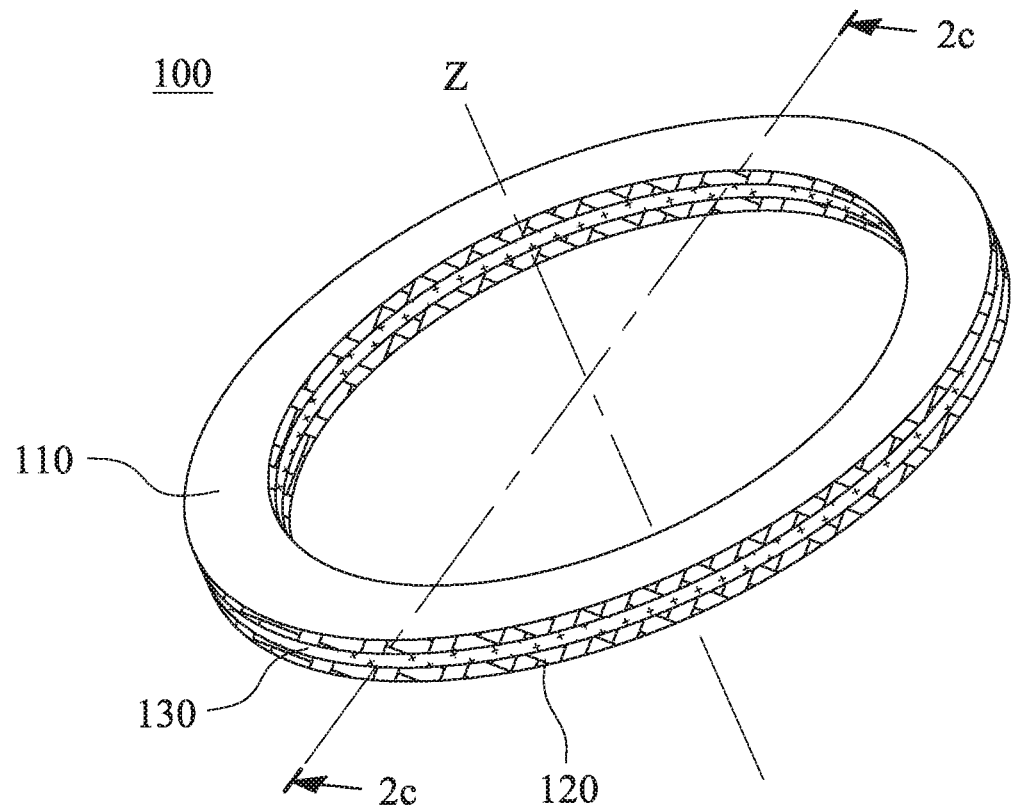
FIG. 2A is a three dimensional view of a composite light blocking sheet according to one embodiment of the present disclosure.
Figure 2B:
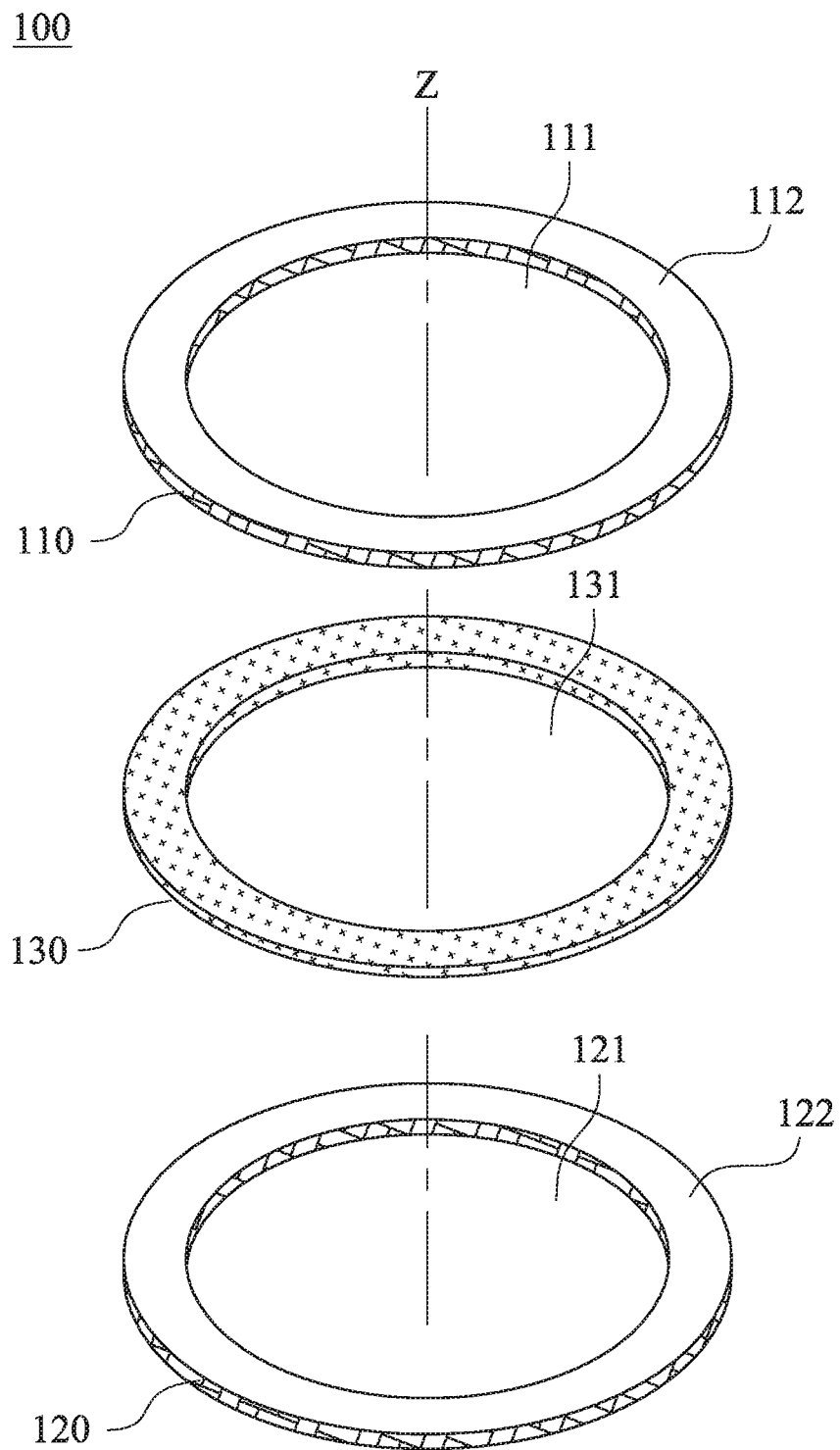
FIG. 2B is an exploded view showing layers of the composite light blocking sheet in FIG. 2A.
Figure 2C:
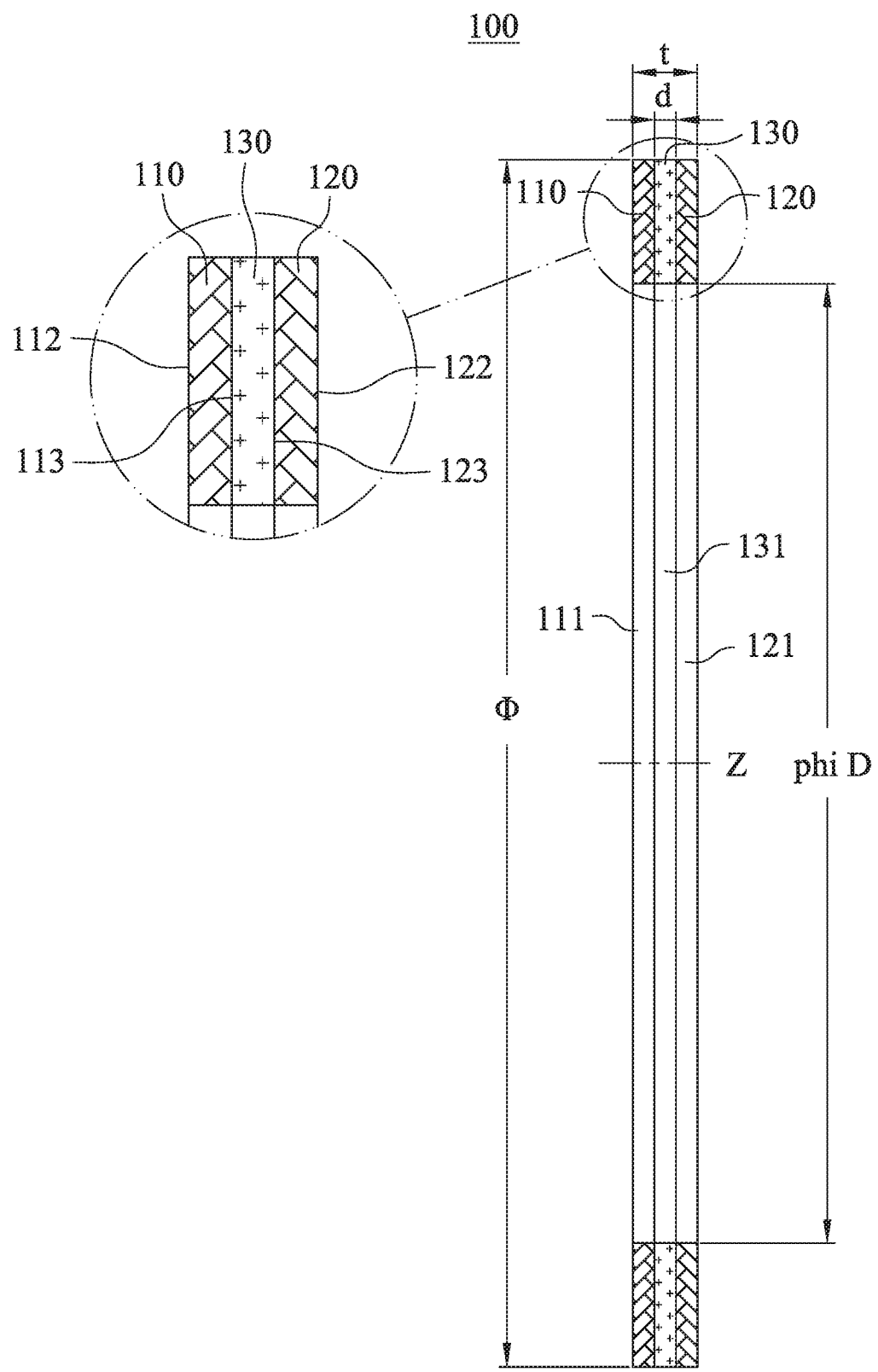
FIG. 2C is a cross-sectional view taken along line 2c-2c of the composite light blocking sheet in FIG. 2A.

Please refer to FIGS. 2A-2C. FIG. 2A is a three dimensional view of a composite light blocking sheet 100 according to one embodiment of the present disclosure, FIG. 2B is an exploded view showing layers of the composite light blocking sheet 100 in FIG. 2A, and FIG. 2C is a cross-sectional view taken along line 2c-2c of the composite light blocking sheet 100 in FIG. 2A. In FIGS. 2A-2C, the composite light blocking sheet 100 includes a first surface layer 110, a second surface layer 120, an inside substrate layer 130 and a central axis Z.

Figure 2D:
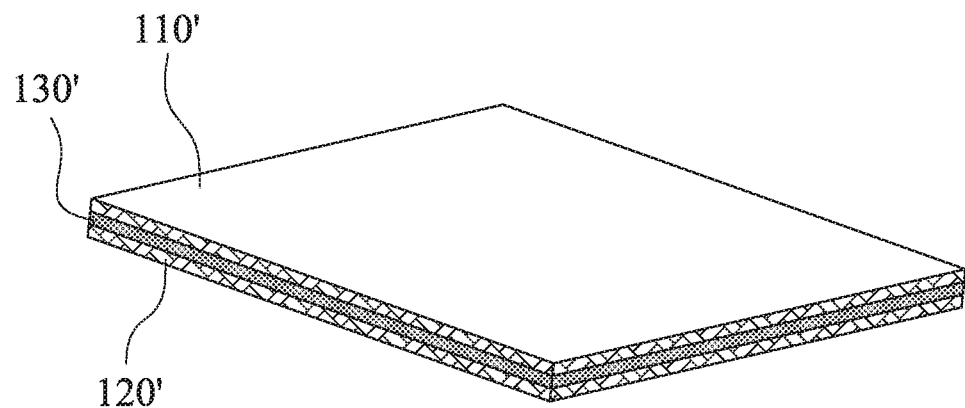
FIG. 2D is a schematic view of a composite material used to manufacture the light blocking sheet in FIG. 2A.
Figure 2E:
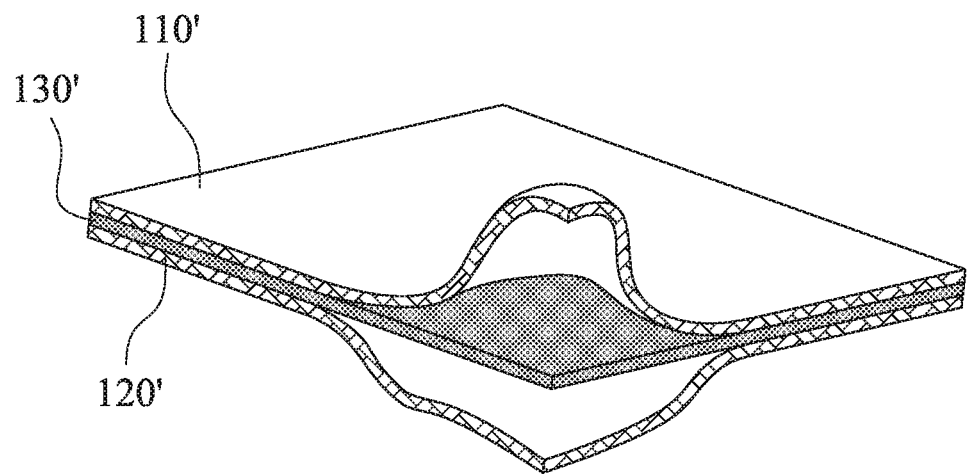
FIG. 2E is a partially separation schematic view of the composite material in FIG. 2D.

In the meanwhile, please refer to FIGS. 2D-2E. FIG. 2D is a schematic view of a composite material used to manufacture the composite light blocking sheet 100 in FIG. 2A, and FIG. 2E is a partially separation schematic view of the composite material in FIG. 2D. In FIGS. 2D-2E, the composite material includes a first surface layer material 110', a second surface layer material 120' and an inside substrate layer material 130'. In FIG. 2E, the first surface layer material 110' and the second surface layer material 120' are tom by an external force and are distorted due to a non-uniform extension, which intends to clearly show the first surface layer material 110', the second surface layer material 120' and the inside substrate layer material 130'. However, under normal circumstance, the first surface layer material 110' is tightly connected with the second surface layer material 120' via the inside substrate layer material 130' as shown in FIG. 2D. Thus, the composite material can be a material band due to the manufacturing method, which allows the composite material to have a uniform thickness by controlling the manufacturing process of the inside substrate layer 130. Moreover, it is favorable to prevent the composite material from warping and to obtain a flat composite material being a thin film, which is favorable to maintain a thin thickness of the composite light blocking sheet 100.

In FIGS. 2A-2C, the first surface layer 110 has a first opening 111, the second surface layer 120 has a second opening 121, and the inside substrate layer 130 has a substrate opening 131. The inside substrate layer 130 is disposed between the first surface layer 110 and the second surface layer 120 so as to connect the first surface layer 110 and the second surface layer 120. The second opening 121 is disposed corresponding to the first opening 111, and the substrate opening 131 is disposed corresponding to the first opening 111 and the second opening 121. The central axis Z is coaxial with the first opening 111, the second opening 121 and the substrate opening 131.

In particular, the first surface layer 110 can include a first outer surface 112 and a first inner surface 113 which are both connected to the first opening 111. The second surface layer 120 can include a second outer surface 122 and a second inner surface 123 which are both connected to the second opening 121. The first surface layer 110 can be connected to the inside substrate layer 130 via the first inner surface 113, and the second surface layer 120 can be connected to the inside substrate layer 130 via the second inner surface 123.

The inside substrate layer 130 can be made of a plastic material, and each of the first surface layer 110 and the second surface layer 120 can be made of a black carbon-containing material. Therefore, the composite light blocking sheet 100 can be made of the composite material, which is favorable for enhancing strength of the material, reducing the thickness of the composite light blocking sheet 100, and Improving uniformity and smoothness of the entire composite light blocking sheet 100. Specifically, the plastic material of the inside substrate layer 130 can be black or transparent polycarbonate (PC), polyethylene terephthalate (PET), polymethylmethacrylate (PMMA) or a combination thereof.

Figure 2F:
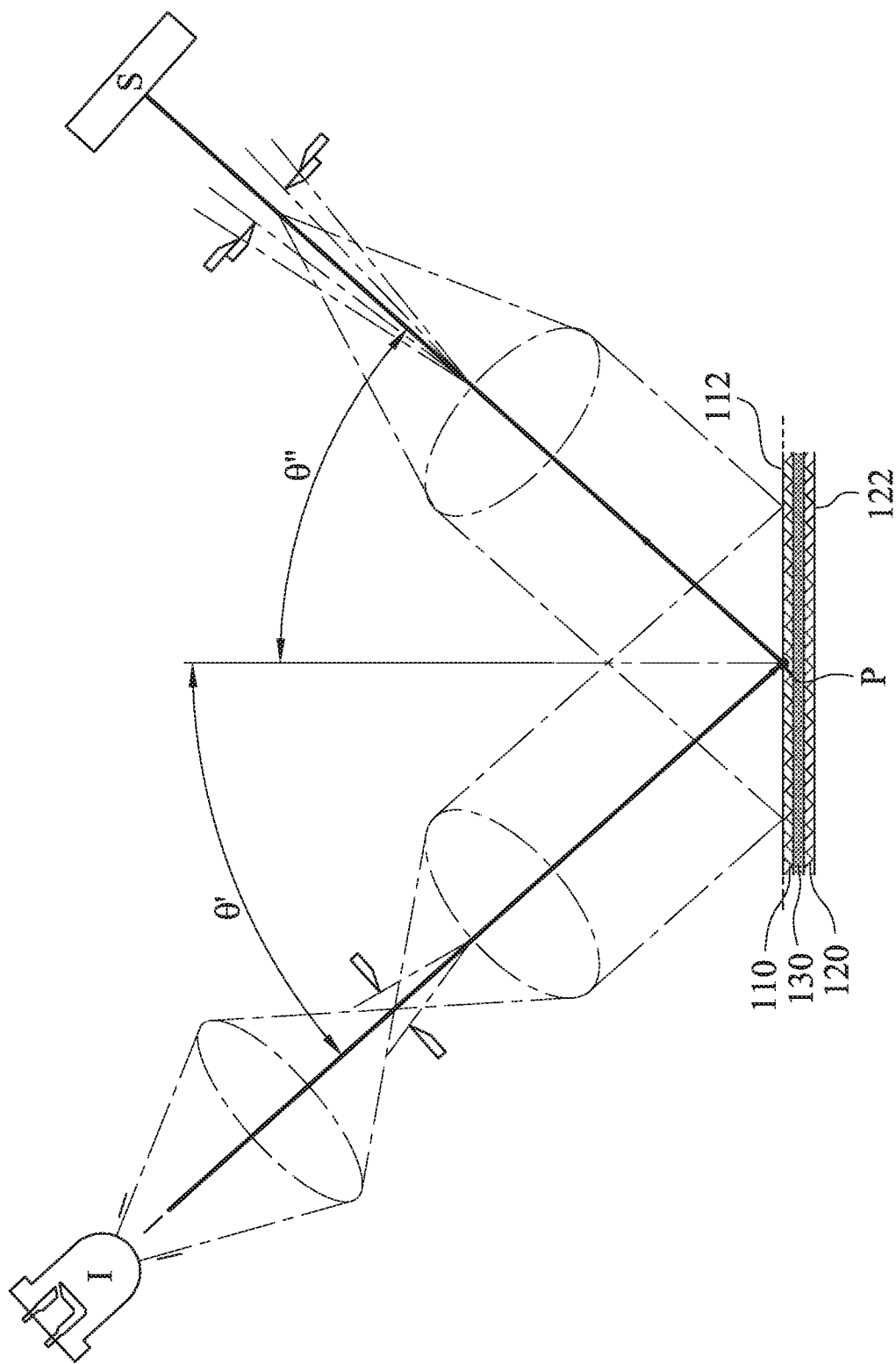
FIG. 2F is a schematic view of a detection method of a gloss of a first outer surface of the first surface layer in FIG. 2A.

FIG. 2F is a schematic view of a detection method of a gloss of a first outer surface 112 of the first surface layer 110 in FIG. 2A. In detail, a gloss meter is usually used to measure a gloss of a surface. The gloss is determined by projecting a beam of a light source at a fixed angle, such as 20 degrees, 60 degrees, 80 degrees or 85 degrees, onto the surface and measuring the amount of reflected light at an equal but opposite angle. In usual, a larger angle of the measurement will be used when the gloss of the surface is lower. In FIG. 2F, a gloss of a specific position P on the first outer surface 112 is determined by projecting a beam of a light source l at an angle θ' onto the specific position P on the first outer surface 112 and measuring the amount of reflected light at an equal but opposite angle θ" by a sensor S. In the present disclosure, the light source l is a white light-emitting diode (LED) and the angle θ' can be 60 degrees. In particular, there are at least two methods of mixing colors to produce white light of the white LED in the present disclosure. One of the methods is to mix blue light, green light and red light, and the other one of the methods is to mix blue light and yellow light. More particular, the white light of the white LED can be produced by mixing blue light and yellow light so as to provide a stable light source in the present disclosure.

After measuring, the gloss of the specific position P on the first outer surface 112 of the first surface layer 110 is obtained. Glosses of other positions on the first outer surface 112 can be determined in turn. Similarly, glosses on the second outer surface 122 can be obtained by the same instrument and method as mentioned above. In the present disclosure, most area of the first outer surface 112 has a first gloss, most area of the second outer surface 122 has a second gloss, and the first gloss is different from the second gloss. More particularly, according to the embodiment of FIG. 2A, when more than 95% of the first outer surface 112 has the first gloss being GU1, and more than 95% of the second outer surface 122 has the second gloss being GU2, the first gloss GU1 is different from the second gloss GU2, and the following condition can be satisfied: 0%<GU1<1.8%; and 2.0%<GU2<9.0%. Accordingly, the correct side of the composite light blocking sheet 100 during the manufacturing process or the assembling process can be identified. Therefore, incorrect assembling of the composite light blocking sheet can be avoided so as to increase flexibility of production line. In the meanwhile, the waste and cost can be further reduced. Moreover, the orientation of the composite light blocking sheet 100 can be adjusted easily when a specific stray light or a shower flare occurs so as to eliminate effects of the stray light. Optionally, the following condition can be satisfied: 2.0<GU2/GU1<18.0. Therefore, the measurements of the gloss between different instruments will not result in significant differences so as to reduce misunderstandings in communication between the production line and the research and development laboratory. Optionally, the following condition can be satisfied: 0.04<GU2/GU1<0.5. Thus, it should be noted that an orientation of the second gloss GU2 with a lower value than the first gloss GU1 can be adjusted to reduce an unexpected surface reflection.

When a thickness of the composite light blocking sheet 100 is t, the following condition can be satisfied: 5 μm<t<50 μm. Thus, the excessive thickness tolerance can be avoided by arranging the proper thickness of the composite light blocking sheet 100. Accordingly, the accumulated spacing tolerance in assembling can be further reduced.

When a thickness of the inside substrate layer 130 is d, and the thickness of the composite light blocking sheet 100 is t, the following condition can be satisfied: 0.16<d/t<0.81. Compared to the first surface layer 110 or the second surface layer 120, the inside substrate layer 130 usually reflects the intense light easily. Thus, the composite light blocking sheet 100 which satisfies the above condition is a thinner light blocking sheet so that less of the inside substrate layer 130 will be exposed to reflect the intense light.

When a maximum outer diameter of the composite light blocking sheet 100 is φ, and the thickness of the composite light blocking sheet 100 is t, the following condition can be satisfied: 1<1000 t/φ<50. Preferably, when the maximum outer diameter of the composite light blocking sheet 100 is φ, and the thickness of the composite light blocking sheet 100 is t, the following condition can be satisfied: 1<1000 t/φ<25. Accordingly, a larger and thinner light blocking range can be provided. Moreover, a firm and thinner light blocking sheet also can be provided by the abovementioned composite material.

A thickness of each of the inside substrate layer 130, the first surface layer 110 and the second surface layer 120 can be uniform. Therefore, the fast and mass production can be achieved. The raw material can be supplied in the form of material band, which is favorable for the subsequent processing. "The thickness can be uniform" refers that the thickness is identical. That is, the thickness of the inside substrate layer 130 parallel to the central axis Z is identical except the substrate opening 131; the thickness of the first surface layer 110 parallel to the central axis Z is identical except the first opening 111; the thickness of the second surface layer 120 parallel to the central axis Z is identical except the second opening 121.

As mentioned above, the orientation of the light blocking sheet 1 cannot be identified when the gloss of the first surface layer L1 is the same as the gloss of the second surface layer L2 in the conventional light blocking sheet 1. Accordingly, a gloss of the first surface layer 110 and a gloss of the second surface layer 120 in the present disclosure are designed to overcome problems existed in the conventional light blocking sheet 1.

Imaging Lens Assembly

Figure 3:
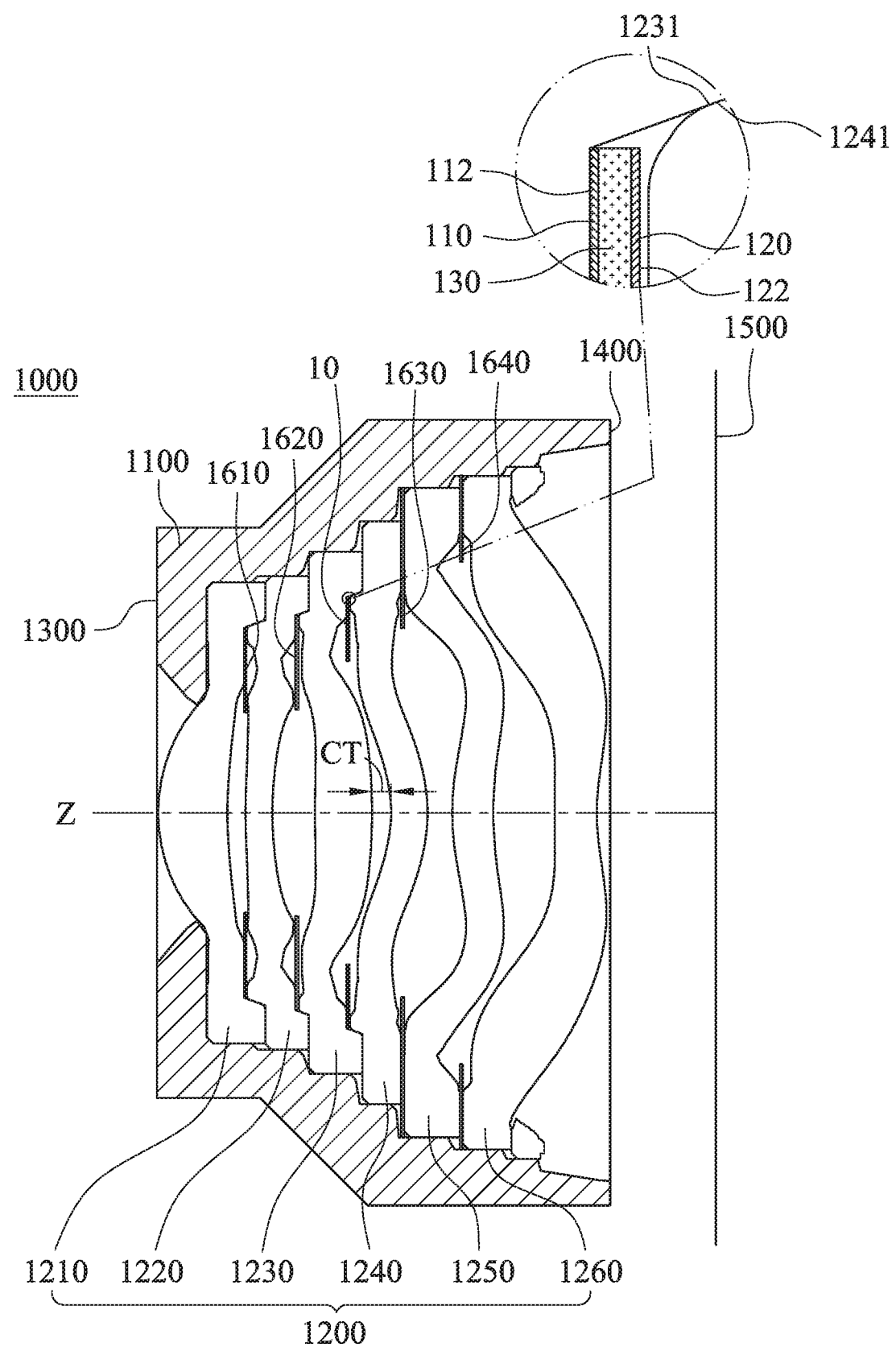
FIG. 3 is a schematic view of an imaging lens assembly according to another embodiment of the present disclosure.

Please refer to FIG. 3, which is a schematic view of an Imaging lens assembly 1000 according to another embodiment of the present disclosure. In FIG. 3, the imaging lens assembly 1000 includes a barrel 1100, an optical lens set 1200 and the composite light blocking sheet 100. The optical lens set 1200 and the composite light blocking sheet 100 can be disposed in the barrel 1100 for providing a compact imaging lens assembly. Preferably, the barrel 1100 has a minimum opening, and a diameter of the substrate opening 131 is smaller than a diameter of the minimum opening of the barrel 1100. Accordingly, the light entered the barrel 1100 will be mainly blocked by the composite light blocking sheet 100 so that the surface properties of the barrel 1100 will not affect the image quality. Thus, the composite light blocking sheet 100, which has the lower gloss, can be applied in a telephoto lens or a dual lens assembly having the telephoto lens.

Specifically, the imaging lens assembly 1000 further includes an object-side end 1300, an image-side end 1400 and an image surface 1500. The object-side end 1300 faces an imaged object (not shown), and the image-side end 1400 faces the image surface 1500. The optical lens set 1200 includes at least two lens elements (1210, 1220, 1230, 1240, 1250, 1260), and the composite light blocking sheet 100 is adjacent to at least one of the lens elements (1210, 1220, 1230, 1240, 1250, and 1260). Other spacing elements (1610, 1620, 1630, and 1640) can be disposed between two of the lens elements (1210, 1220, 1230, 1240, 1250, and 1260).

More specifically, the optical lens set 1200 includes a first lens element 1210, a second lens element 1220, a third lens element 1230, a fourth lens element 1240, a fifth lens element 1250 and a sixth lens element 1260. A spacing element 1610 is disposed between the first lens element 1210 and the second lens element 1220. A spacing element 1620 is disposed between the second lens element. 1220 and the third lens element 1230. A spacing element 1630 is disposed between the fourth lens element 1240 and the fifth lens element 1250. A spacing element 1640 is disposed between the fifth lens element 1250 and the sixth lens element 1260. It is noted that the spacing element 1610, the spacing element 1620, the spacing element 1630 and/or the spacing element 1640 can be replaced by the composite light blocking sheet 100.

In FIG. 3, the composite light blocking sheet 100 can be disposed between the third lens element 1230 and the fourth lens element 1240. In practical, the composite light blocking sheet 100 can be disposed between any two of the first lens element 1210, the second lens element 1220, the third lens element 1230, the fourth lens element 1240, the fifth lens element 1250 and the sixth lens element 1260. In the other words, the position and the number of the composite light blocking sheet 100 is only exemplary in the embodiment. Moreover, the first outer surface 112 of the first surface layer 110 of the composite light blocking sheet 100 faces towards the object-side end 1300 of the imaging lens assembly 1000. The second outer surface 122 of the second surface layer 120 of the composite light blocking sheet 100 faces towards the image-side end 1400 of the imaging lens assembly 1000. Therefore, the reflection of the stray lights can be reduced. If it unifiedly allows the outer surface having the lower gloss to face towards the object-side end, the assembling process of the imaging lens assembly 1000 can be simplified.

In addition, as shown in a partial enlarged diagram in FIG. 3, the third lens element 1230 has an axial connecting surface 1231, and the fourth lens element 1240 has an axial connecting surface 1241 for assembling with the third lens element 1230 so as to align a center of the third lens element 1230 to a center of the fourth lens element 1240. Furthermore, an outer diameter of the composite light blocking sheet 100 is smaller than or equal to a minimum inner diameter of each of the axial connecting surface 1231 and the axial connecting surface 1241. Therefore, a proper light blocking position is provided for the composite light blocking sheet 100. It further prevents the composite light blocking sheet 100 from shaking over a predetermined range so as to enhance stability of the assembling process. Preferably, each of the axial connecting surface 1231 and the axial connecting surface 1241 can be a conical surface. Therefore, the assembling of the lens elements and the alignment between the lens element and the composite light blocking sheet become easier. More preferably, when an angle between each of the conical surfaces and the central axis Z is θ, the following condition can be satisfied: 0 degrees<θ<40 degrees. Therefore, the assembling of the composite light blocking sheet 100 becomes easier.

When a diameter of the substrate opening 131 is phi D, and a focal length of the imaging lens assembly 1000 is f, the following condition can be satisfied: 0.30<f/phi D<3.2. Preferably, when the diameter of the substrate opening 131 is phi D, and the focal length of the imaging lens assembly 1000 is f, the following condition can be satisfied: 0.50<f/phi D<2.2. Therefore, the composite light blocking sheet 100 is appropriate for an imaging lens assembly with demands of large amount of light that can reach an image surface.

When a distance on the central axis Z between the two lens elements, where the composite light blocking sheet 100 is disposed therebetween, is CT, and the thickness of the composite light blocking sheet 100 is t, the following condition can be satisfied: 0.5<CT/t<35.0. Therefore, an ideal light blocking effect is achieved in a compact lens structure. Preferably, when the distance on the central axis Z between the two lens elements, where the composite light blocking sheet 100 is disposed therebetween, is CT, and the thickness of the composite light blocking sheet 100 is t, the following condition can be further satisfied: 2.0<CT/t<25.0. Accordingly, the composite light blocking sheet 100 of the present disclosure Is favorable to be applied in a high image quality imaging lens assembly that can include a plurality of lens elements (at least five lens elements). In order to reduce the stray lights in the imaging lens assembly 1000 under the intense light, more surface of the composite light blocking sheet 100 having a lower gloss can be designed to improve the image quality.

The composite light blocking sheet 100 can not only be applied for blocking light but also can be an aperture stop of the imaging lens assembly 1000. Therefore, the structure of the imaging lens assembly 1000 can be simplified. Moreover, the composite light blocking sheet 100 has a lower gloss so that unexpected stray lights can be avoided so as to be a more accurate optical element.

The details of the composite light blocking sheet 100, such as the thickness of the composite light blocking sheet 100, the thickness of the inside substrate layer 130, the diameter of the substrate opening 131 and the glosses of the first outer surface 112 and the second outer surface 122, are illustrated as above, and there is no further description herein.

Electronic Device

Figure 4:
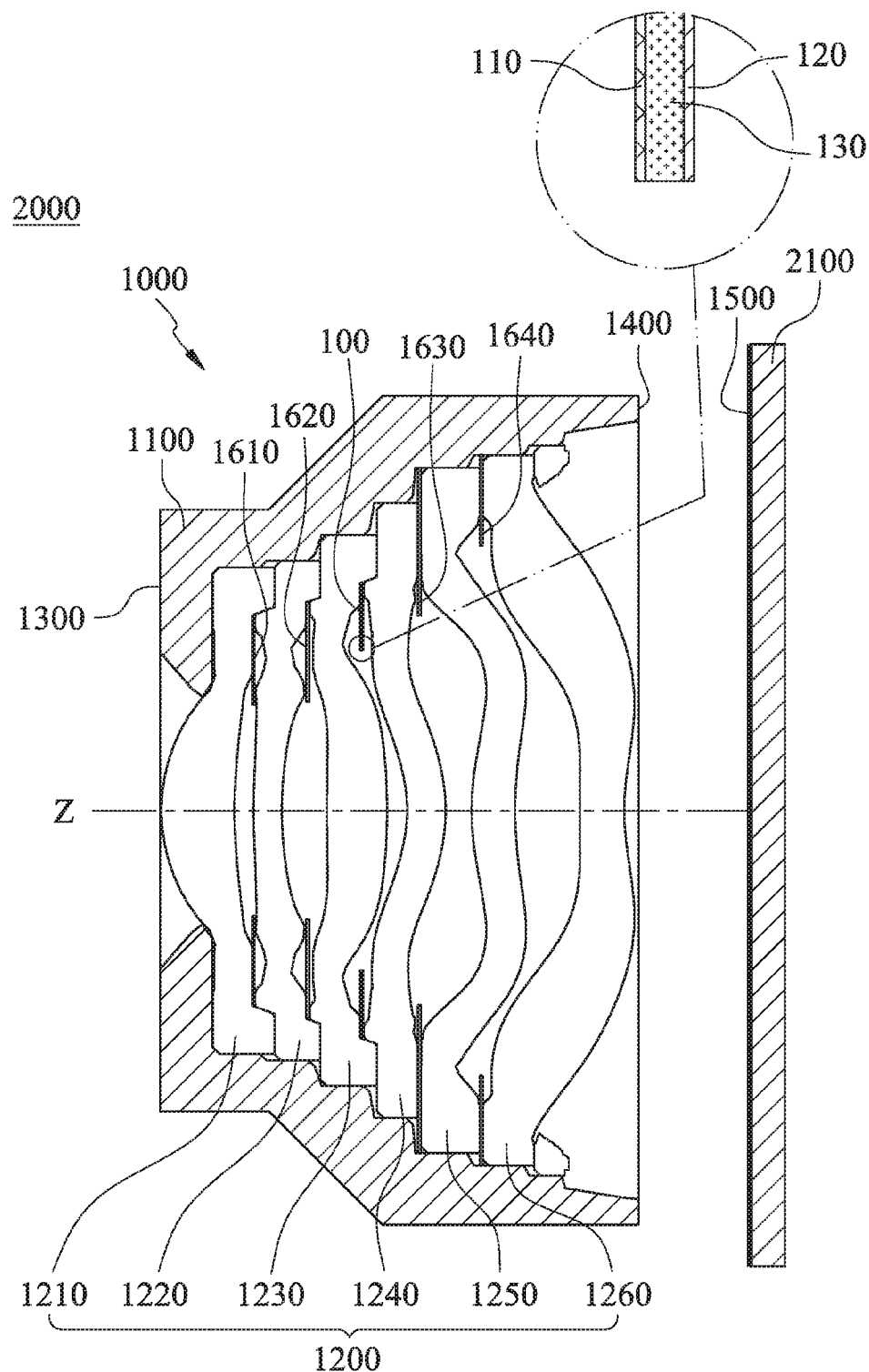
FIG. 4 is a schematic view of an electronic device according to another embodiment of the present disclosure.

Please refer to FIG. 4, which is a schematic view of an electronic device 2000 according to another embodiment of the present disclosure. In FIG. 4, the electronic device 2000 includes the imaging lens assembly 1000 in FIG. 3 and an image sensor 2100. The image sensor 2100 can be disposed on the image surface 1500 of the imaging lens assembly 1000. Therefore, the reflection of the stray light can be effectively reduced by correcting assembling the composite light blocking sheet 100, and the image quality can be maintained, so that the demand of high-end image specifications of the electronic device 2000 can be satisfied. The electronic device 2000 can further include but not limited to a display, a control unit, a storage unit, a random access memory unit (RAM), a read only memory unit (ROM) or a combination thereof. Moreover, the electronic device 2000 can be applied to but is not limited to a 3D (three-dimensional) image capturing applications, in products such as digital cameras, mobile devices, digital tablets, smart TV, surveillance devices, game consoles with motion sensing function, vehicle cameras such as driving recording systems and rear view camera systems, aerial photography devices, sports photography equipment, all kinds of smart electronics and wearable devices.

1st Example

Figure 5A:
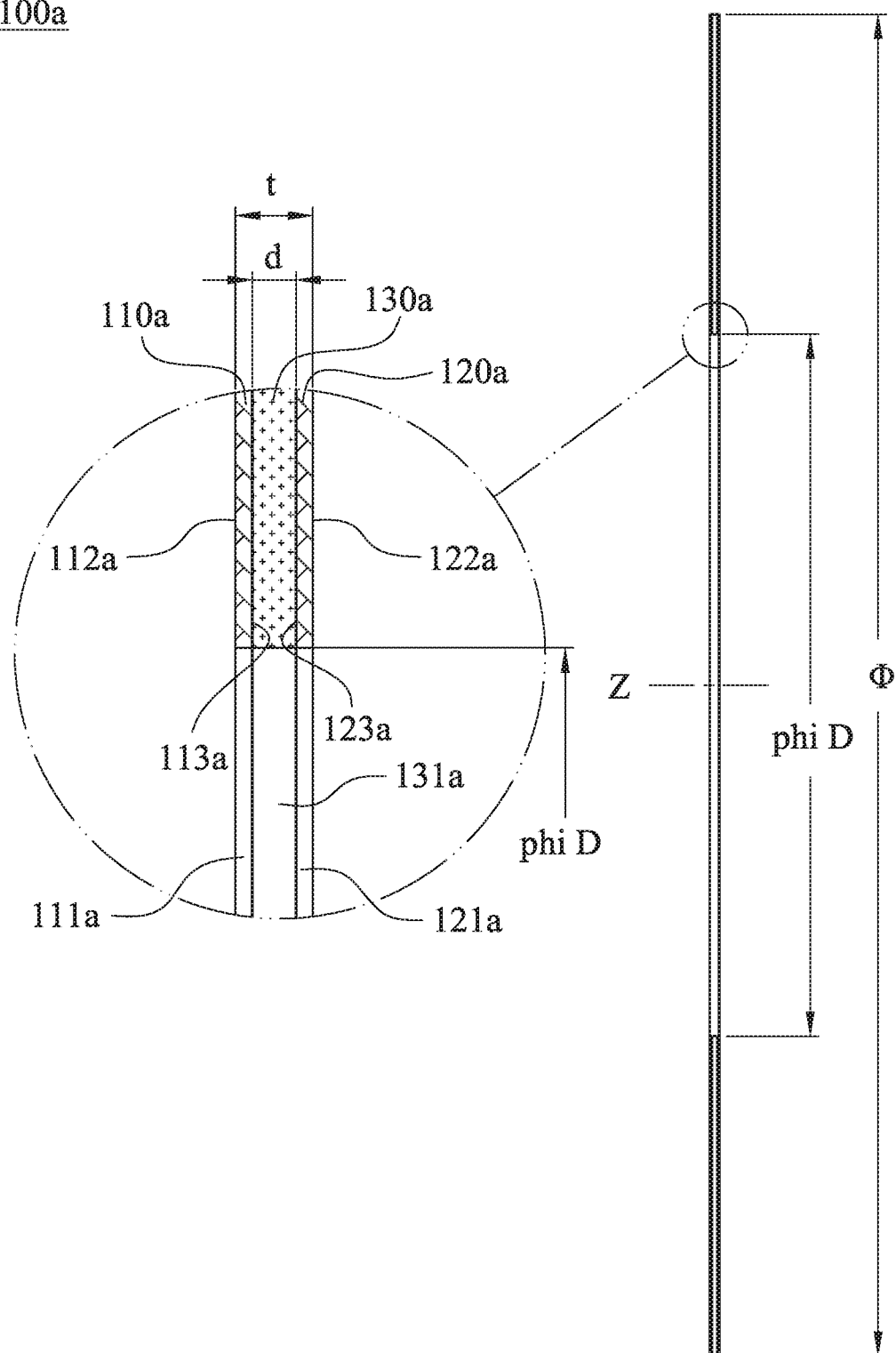
FIG. 5A is a cross-sectional view of a composite light blocking sheet according to a 1st example of the present disclosure.

FIG. 5A is a cross-sectional view of a composite light blocking sheet 100a according to a 1st example of the present disclosure, and a view angle of FIG. 5A is the same as that in FIG. 2C. The composite light blocking sheet 100a includes a first surface layer 110a, a second surface layer 120a, an inside substrate layer 130a and a central axis Z. The first surface layer 110a includes a first opening 111a, the second surface layer 120a includes a second opening 121a, and the inside substrate layer 130a includes a substrate opening 131a. The inside substrate layer 130a is disposed between the first surface layer 110a and the second surface layer 120a so as to connect the first surface layer 110a and the second surface layer 120a. The second opening 121a is disposed corresponding to the first opening 111a, and the substrate opening 131a is disposed corresponding to the first opening 111a and the second opening 121a. The central axis Z is coaxial with the first opening 111a, the second opening 121a and the substrate opening 131a.

In particular, the first surface layer 110a includes a first outer surface 112a and a first inner surface 113a which are both connected to the first opening 111a. The second surface layer 120a includes a second outer surface 122a and a second inner surface 123a which are both connected to the second opening 121a. The first surface layer 110a is connected to the inside substrate layer 130a via the first inner surface 113a, and the second surface layer 120a is connected to the inside substrate layer 130a via the second inner surface 123a. Moreover, more than 95% of the first outer surface 112a has a first gloss being GU1, and more than 95% of the second outer surface 122a has a second gloss being GU2, wherein the first gloss GU1 is different from the second gloss GU2.

In the composite light blocking sheet 100a according to the 1st example, a thickness of the inside substrate layer 130a is d, a thickness of the composite light blocking sheet 100a is t, a maximum outer diameter of the composite light blocking sheet 100a is ϕ, and a diameter of the substrate opening 131a is phi D. The values of d, t, d/t, ϕ, 1000 t/ϕ, phi D, GU1, GU2, and GU2/GU1 of the 1st example are listed in Table 1.

TABLE 1

| 1st Example | | | |
|---|---|---|---|
| d (mm) | 0.013 | phi D | 1.7 |
| t (mm) | 0.023 | GU1 (%) | 0.6 |
| d/t | 0.565 | GU2 (%) | 8 |
| Φ (mm) | 3.25 | GU2/GU1 | 13.33 |
| 1000 t/Φ | 7.077 | | |

2nd Example

Figure 5B:
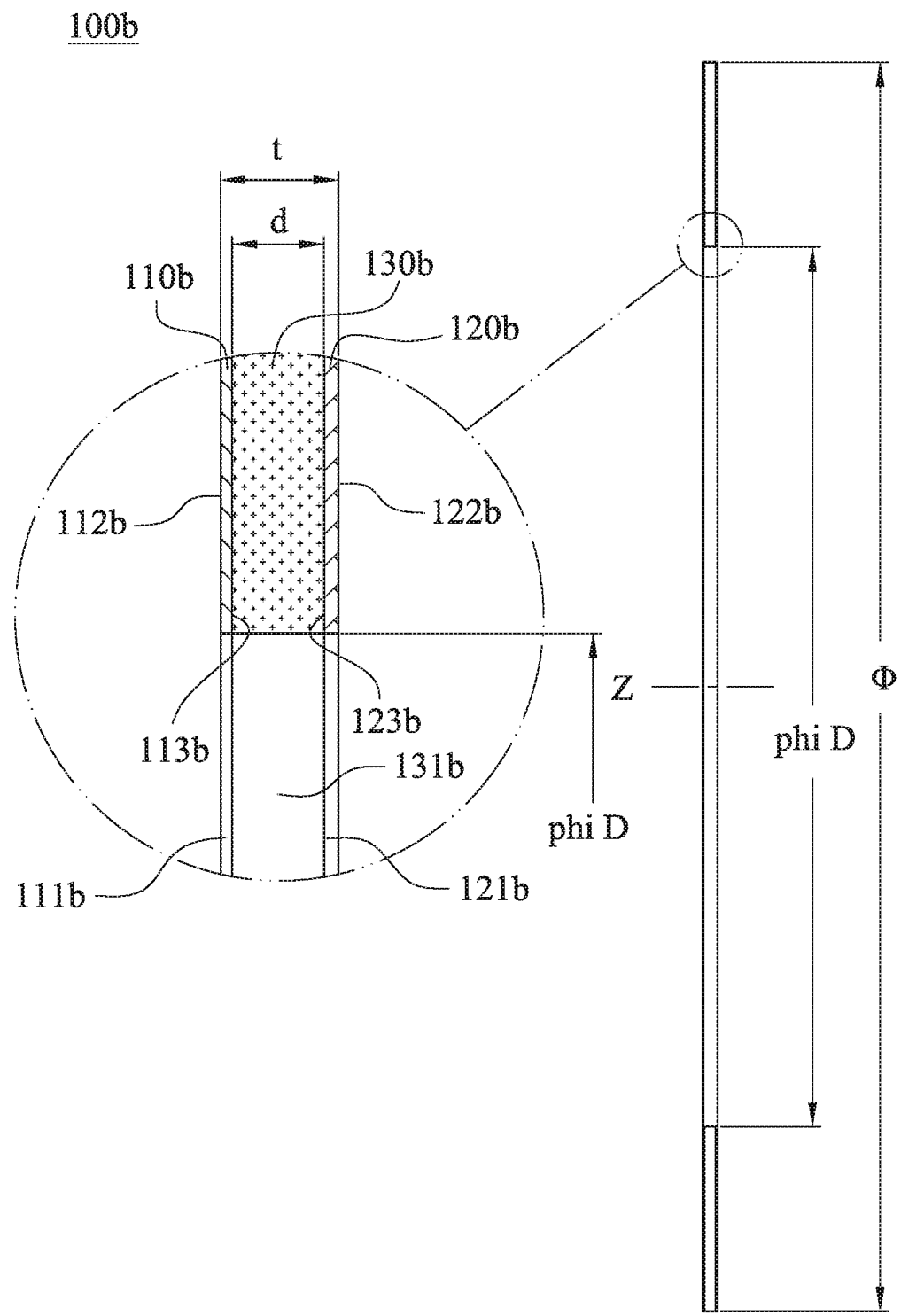
FIG. 5B is a cross-sectional view of a composite light blocking sheet according to a 2nd example of the present disclosure.

FIG. 5B is a cross-sectional view of a composite light blocking sheet 100b according to a 2nd example of the present disclosure, and a view angle of FIG. 5B is the same as that in FIG. 2C. The composite light blocking sheet 100b includes a first surface layer 110b, a second surface layer 120b, an inside substrate layer 130b and a central axis Z. The first surface layer 110b includes a first opening 111b, the second surface layer 120b includes a second opening 121b, and the inside substrate layer 130b includes a substrate opening 131b. The inside substrate layer 130b is disposed between the first surface layer 110b and the second surface layer 120b so as to connect the first surface layer 110b and the second surface layer 120b. The second opening 121b is disposed corresponding to the first opening 111b, and the substrate opening 131b is disposed corresponding to the first opening 111b and the second opening 121b. The central axis Z is coaxial with the first opening 111b, the second opening 121b and the substrate opening 131b.

In particular, the first surface layer 110b includes a first outer surface 112b and a first inner surface 113b which are both connected to the first opening 111b. The second surface layer 120b includes a second outer surface 122b and a second inner surface 123b which are both connected to the second opening 121b. The first surface layer 110b is connected to the inside substrate layer 130b via the first inner surface 113b, and the second surface layer 120b is connected to the inside substrate layer 130b via the second inner surface 123b. Moreover, more than 95% of the first outer surface 112b has a first gloss being GU1, and more than 95% of the second outer surface 122b has a second gloss being GU2, wherein the first gloss GU is different from the second gloss GU2.

In the 2nd example, the definitions of these parameters as shown in the following Table 2 are the same as those stated in the 1st example with corresponding values for the 2nd example, so an explanation in this regard will not be provided again.

TABLE 2

| 2nd Example | | | |
|---|---|---|---|
| d (mm) | 0.032 | phi D | 2.5 |
| t (mm) | 0.041 | GU1 (%) | 0.4 |
| d/t | 0.780 | GU2 (%) | 3 |
| Φ (mm) | 3.55 | GU2/GU1 | 7.5 |
| 1000 t/Φ | 11.549 | | |

3rd Example

Figure 5C:
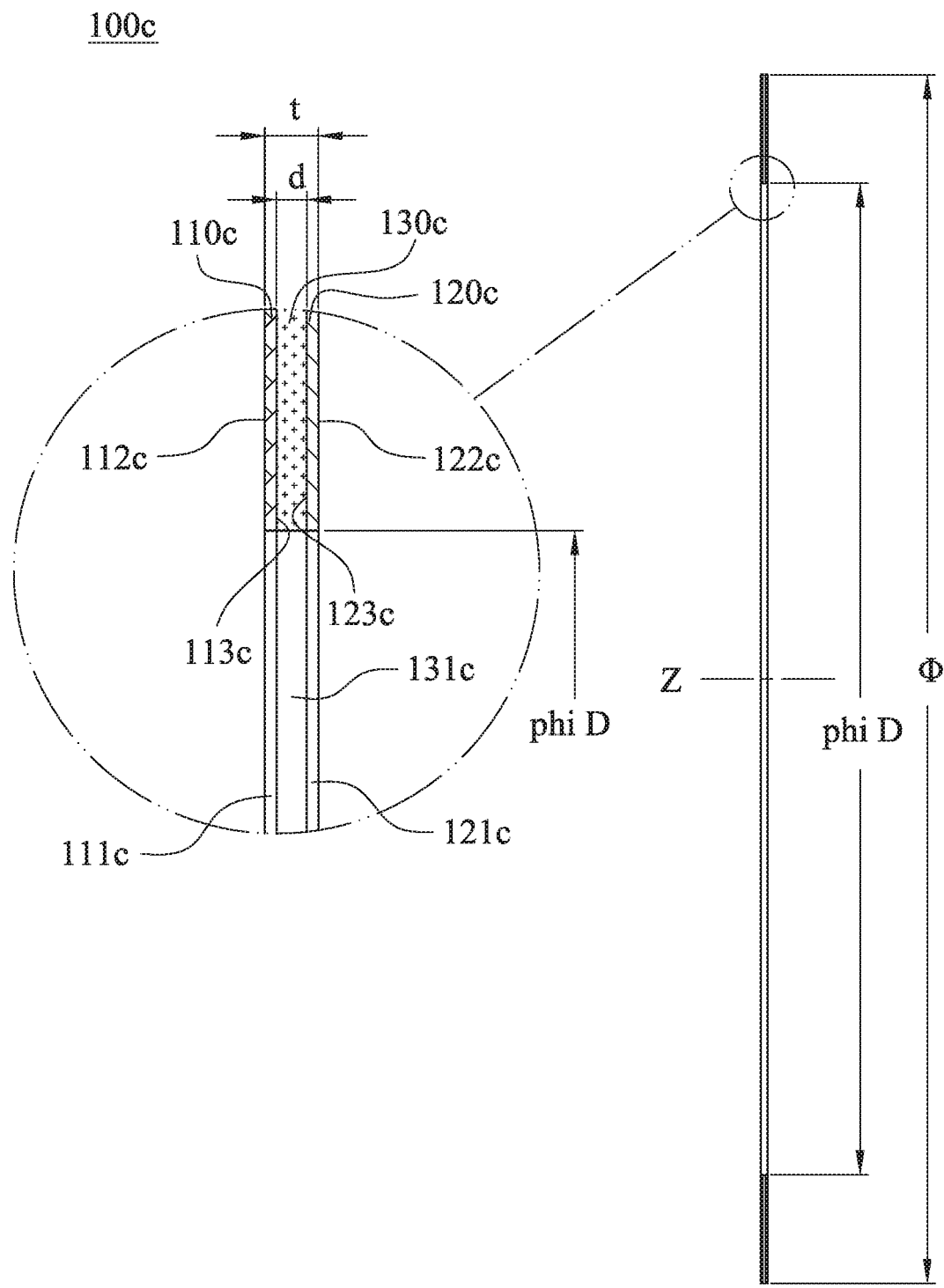
FIG. 5C is a cross-sectional view of a composite light blocking sheet according to a 3rd example of the present disclosure.

FIG. 5C is a cross-sectional view of a composite light blocking sheet 100c according to a 3rd example of the present disclosure, and a view angle of FIG. 5C is the same as that in FIG. 2C. The composite light blocking sheet 100c includes a first surface layer 110c, a second surface layer 120c, an inside substrate layer 130c and a central axis Z. The first surface layer 110c includes a first opening 111c, the second surface layer 120c includes a second opening 121c, and the inside substrate layer 130c includes a substrate opening 131c. The inside substrate layer 130c is disposed between the first surface layer 110c and the second surface layer 120c so as to connect the first surface layer 110c and the second surface layer 120c. The second opening 121c is disposed corresponding to the first opening 111c, and the substrate opening 131c is disposed corresponding to the first opening 111c and the second opening 121c. The central axis Z is coaxial with the first opening 111c, the second opening 121c and the substrate opening 131c.

In particular, the first surface layer 110c includes a first outer surface 112c and a first inner surface 113c which are both connected to the first opening 111c. The second surface layer 120c includes a second outer surface 122c and a second inner surface 123c which are both connected to the second opening 121c. The first surface layer 110c is connected to the inside substrate layer 130c via the first inner surface 113c, and the second surface layer 120c is connected to the inside substrate layer 130c via the second inner surface 123c. Moreover, more than 95% of the first outer surface 112c has a first gloss being GU1, and more than 95% of the second outer surface 122c has a second gloss being GU2, wherein the first gloss GU1 is different from the second gloss GU2.

In the 3rd example, the definitions of these parameters as shown in the following Table 3 are the same as those stated in the 1st example with corresponding values for the 3rd example, so an explanation in this regard will not be provided again.

TABLE 3

| 3rd Example | | | |
|---|---|---|---|
| d (mm) | 0.013 | phi D | 3.48 |
| t (mm) | 0.023 | GU1 (%) | 1.2 |
| d/t | 0.565 | GU2 (%) | 5.4 |
| $\Phi$ (mm) | 4.24 | GU2/GU1 | 4.5 |
| 1000 t/$\Phi$ | 5.425 | | |

4th Example

Figure 5D:
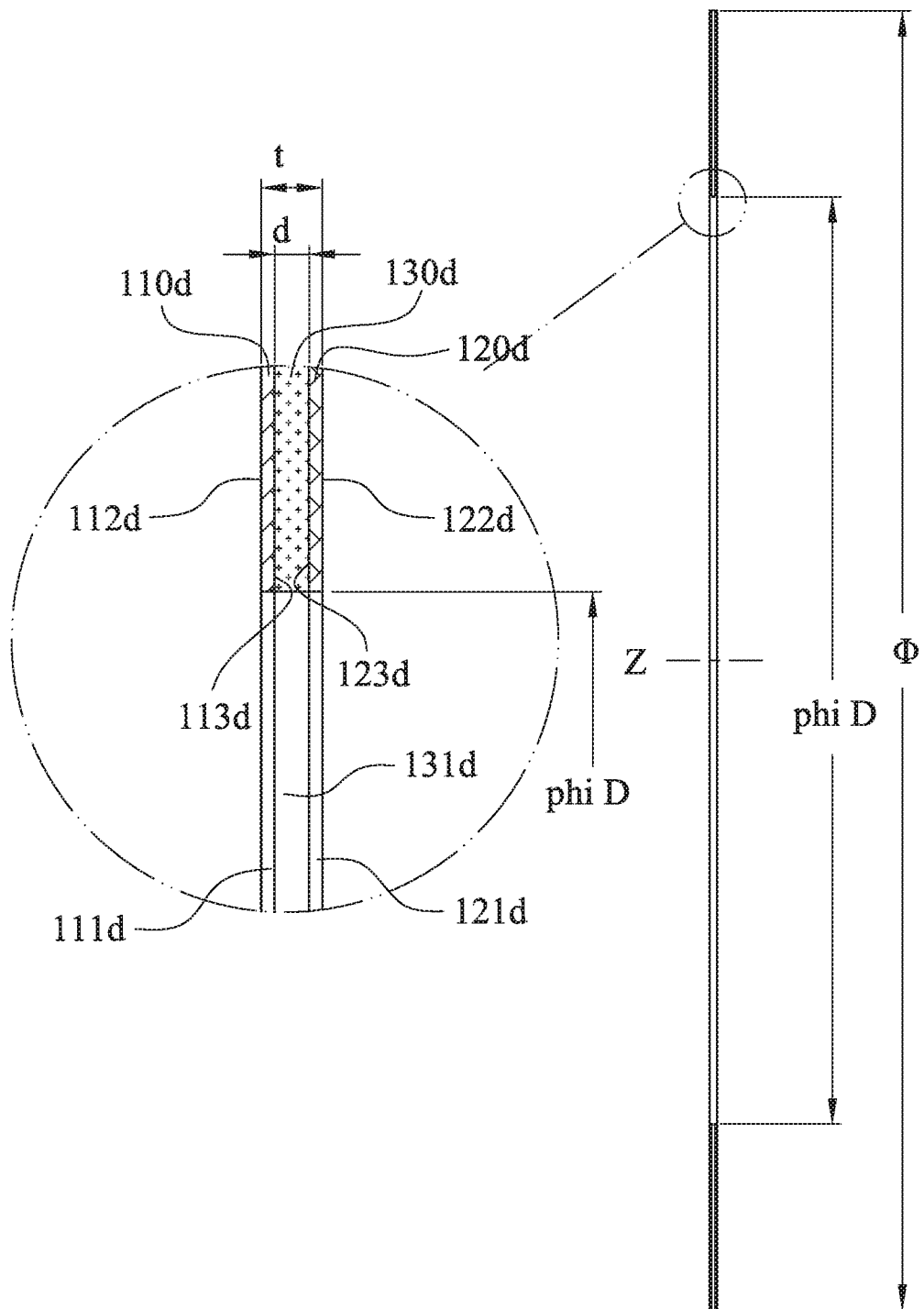
FIG. 5D is a cross-sectional view of a composite light blocking sheet according to a 4th example of the present disclosure.

FIG. 5D is a cross-sectional view of a composite light blocking sheet 100d according to a 4th example of the present disclosure, and a view angle of FIG. 5D is the same as that in FIG. 2C. The composite light blocking sheet 100d includes a first surface layer 110d, a second surface layer 120d, an inside substrate layer 130d and a central axis Z. The first surface layer 110d includes a first opening 111d, the second surface layer 120d includes a second opening 121d, and the inside substrate layer 130d includes a substrate opening 131d. The inside substrate layer 130d is disposed between the first surface layer 110d and the second surface layer 120d so as to connect the first surface layer 110d and the second surface layer 120d. The second opening 121d is disposed corresponding to the first opening 111d, and the substrate opening 131d is disposed corresponding to the first opening 111d and the second opening 121d. The central axis Z is coaxial with the first opening 111d, the second opening 121d and the substrate opening 131d.

In particular, the first surface layer 110d includes a first outer surface 112d and a first inner surface 113d which are both connected to the first opening 111d. The second surface layer 120d includes a second outer surface 122d and a second inner surface 123d which are both connected to the second opening 121d. The first surface layer 110d is connected to the inside substrate layer 130d via the first inner surface 113d, and the second surface layer 120d is connected to the inside substrate layer 130d via the second inner surface 123d. Moreover, more than 95% of the first outer surface 112d has a first gloss being GU1, and more than 95% of the second outer surface 122d has a second gloss being GU2, wherein the first gloss GU1 is different from the second gloss GU2.

In the 4th example, the definitions of these parameters as shown in the following Table 4 are the same as those stated in the 1st example with corresponding values for the 4th example. In some situations, it should be noted that an orientation of the second gloss GU2 with a lower value than the first gloss GU1 toward a different direction from previously mentioned examples can help reduce an unexpected surface reflection.

TABLE 4

| 4th Example | | | |
|---|---|---|---|
| d (mm) | 0.013 | phi D | 2.84 |
| t (mm) | 0.023 | GU1 (%) | 7.6 |
| d/t | 0.565 | GU2 (%) | 0.9 |
| $\Phi$ (mm) | 3.98 | GU2/GU1 | 0.118 |
| 1000 t/$\Phi$ | 5.779 | | |

5th Example

Figure 5E:
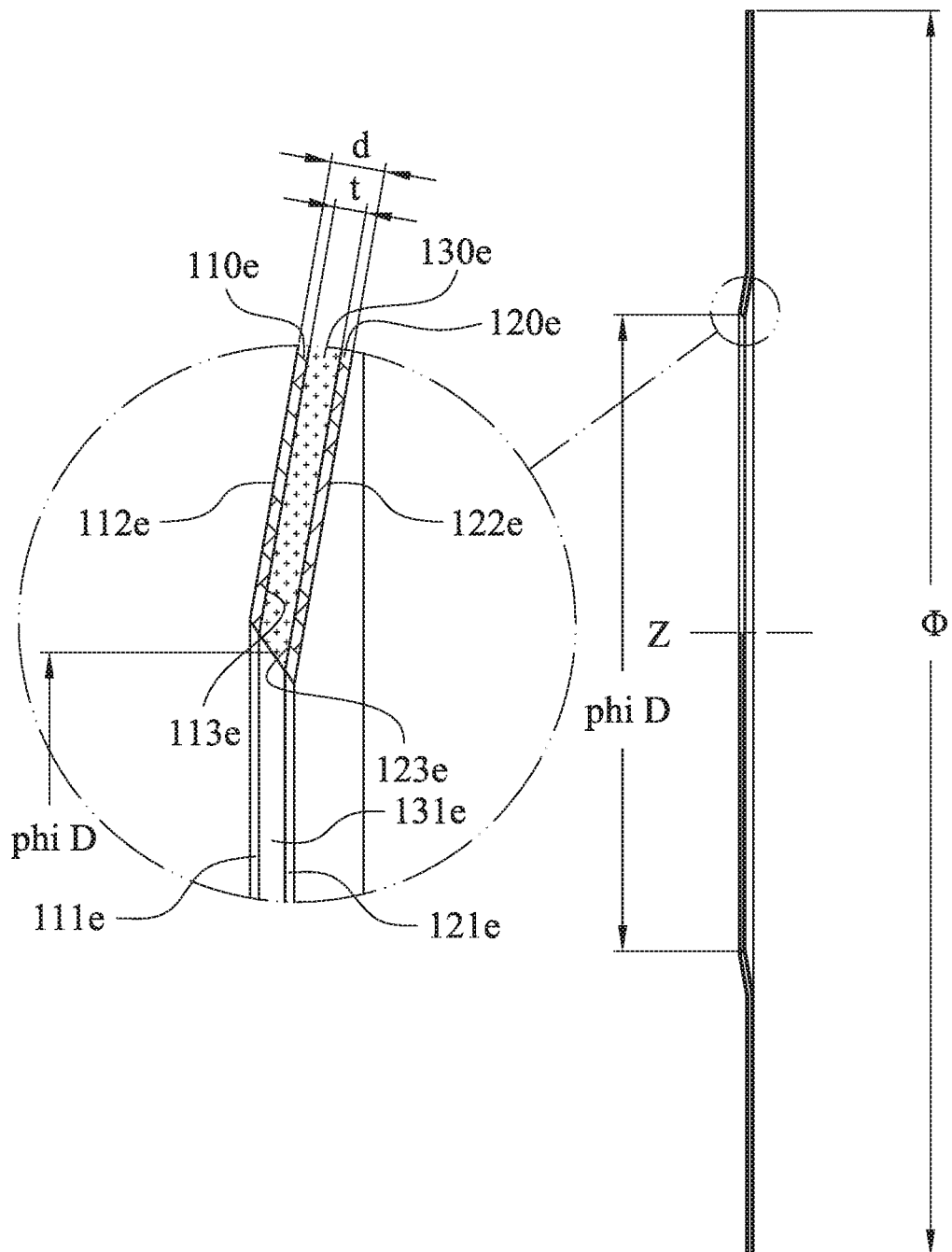
FIG. 5E is a cross-sectional view of a composite light blocking sheet according to a 5th example of the present disclosure.

FIG. 5E is a cross-sectional view of a composite light blocking sheet 100e according to a 5th example of the present disclosure, and a view angle of FIG. 5E is the same as that in FIG. 2C. The composite light blocking sheet 100e includes a first surface layer 110e, a second surface layer 120e, an inside substrate layer 130e and a central axis Z. The first surface layer 110e includes a first opening 111e, the second surface layer 120e includes a second opening 121e, and the inside substrate layer 130e includes a substrate opening 131e. The inside substrate layer 130e is disposed between the first surface layer 110e and the second surface layer 120e so as to connect the first surface layer 110e and the second surface layer 120e. The second opening 121e is disposed corresponding to the first opening 111e, and the substrate opening 131e is disposed corresponding to the first opening 111e and the second opening 121e. The central axis Z is coaxial with the first opening 111e, the second opening 121e and the substrate opening 131e.

In the 5th example, a portion of the second surface layer 120e near the second opening 121e bends towards the inside substrate layer 130e and the first surface layer 110e. That is, the composite light blocking sheet 100e is not a flat sheet. Moreover, a diameter of the second opening 121e is smaller than a diameter of the substrate opening 131e, and the diameter of the substrate opening 131e is smaller than a diameter of the first opening 111e. That is, the inner surface of the first opening 111e, the substrate opening 131e and the second opening 121e is a conical surface.

In particular, the first surface layer 110e includes a first outer surface 112e and a first inner surface 113e which are both connected to the first opening 111e. The second surface layer 120e includes a second outer surface 122e and a second inner surface 123e which are both connected to the second opening 121e. The first surface layer 110e is connected to the inside substrate layer 130e via the first inner surface 113e, and the second surface layer 120e is connected to the inside substrate layer 130e via the second inner surface 123e. Moreover, more than 95% of the first outer surface 112e has a first gloss being GU1, and more than 95% of the second outer surface 122e has a second gloss being GU2, wherein the first gloss GU1 is different from the second gloss GU2.

In the 5th example, the definitions of these parameters as shown in the following Table 5 are the same as those stated in the 1st example with corresponding values for the 5th example, so an explanation in this regard will not be provided again.

TABLE 5

| 5th Example | | | |
|---|---|---|---|
| d (mm) | 0.014 | phi D | 2.28 |
| t (mm) | 0.024 | GU1 (%) | 0.8 |
| d/t | 0.583 | GU2 (%) | 3.8 |

TABLE 5-continued

| 5th Example | | | |
|---|---|---|---|
| Φ (mm) | 4.45 | GU2/GU1 | 4.75 |
| 1000 t/Φ | 5.393 | | |

6th Example

Figure 5F:
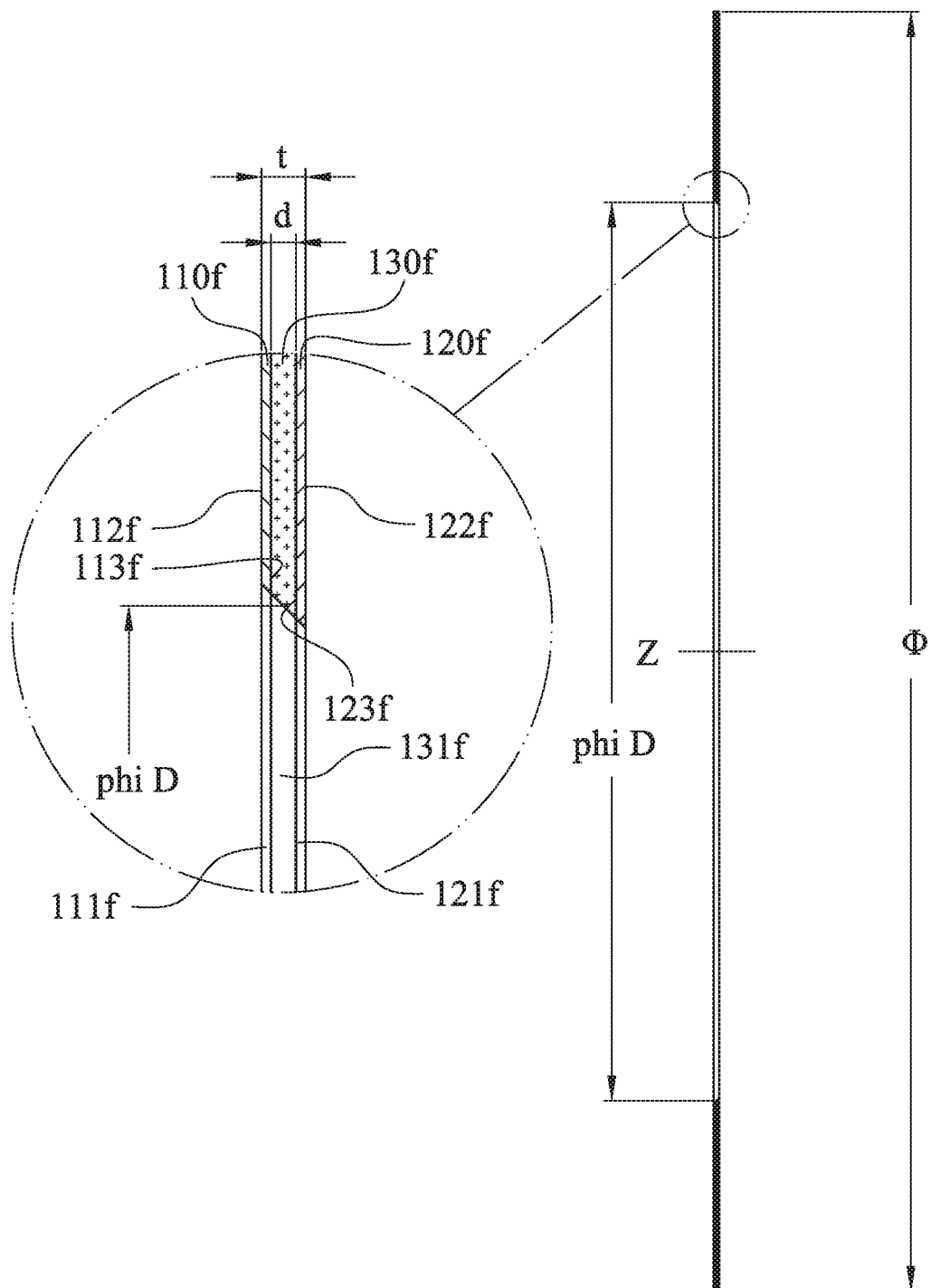
FIG. 5F is a cross-sectional view of a composite light blocking sheet according to a 6th example of the present disclosure.

FIG. 5F is a cross-sectional view of a composite light blocking sheet 100f according to a 6th example of the present disclosure, and a view angle of FIG. 5F is the same as that in FIG. 2C. The composite light blocking sheet 100f includes a first surface layer 110f, a second surface layer 120f, an inside substrate layer 130f and a central axis Z. The first surface layer 110f includes a first opening 111f, the second surface layer 120f includes a second opening 121f, and the inside substrate layer 130f includes a substrate opening 131f. The inside substrate layer 130f is disposed between the first surface layer 110f and the second surface layer 120f so as to connect the first surface layer 110f and the second surface layer 120f. The second opening 121f is disposed corresponding to the first opening 111f, and the substrate opening 131f is disposed corresponding to the first opening 111f and the second opening 121f. Moreover, a diameter of the second opening 121f is smaller than a diameter of the substrate opening 131f, and the diameter of the substrate opening 131f is smaller than a diameter of the first opening 111f. That is, the inner surface of the first opening 111f, the substrate opening 131f and the second opening 121f is a conical surface. The central axis Z is coaxial with the first opening 111f, the second opening 121f and the substrate opening 131f.

In particular, the first surface layer 110f includes a first outer surface 112f and a first inner surface 113f which are both connected to the first opening 111f. The second surface layer 120f includes a second outer surface 122f and a second inner surface 123f which are both connected to the second opening 121f. The first surface layer 110f is connected to the inside substrate layer 130f via the first inner surface 113f, and the second surface layer 120f is connected to the inside substrate layer 130f via the second inner surface 123f. Moreover, more than 95% of the first outer surface 112f has a first gloss being GU1, and more than 95% of the second outer surface 122f has a second gloss being GU2, wherein the first gloss GU1 is different from the second gloss GU2.

In the 6th example, the definitions of these parameters as shown in the following Table 6 are the same as those stated in the 1st example with corresponding values for the 6th example, so an explanation in this regard will not be provided again.

TABLE 6

| 6th Example | | | |
|---|---|---|---|
| d (mm) | 0.013 | phi D | 3.83 |
| t (mm) | 0.023 | GU1 (%) | 0.9 |
| d/t | 0.565 | GU2 (%) | 6.8 |
| Φ (mm) | 5.45 | GU2/GU1 | 7.56 |
| 1000 t/Φ | 4.22 | | |

7th Example

Figure 5G:
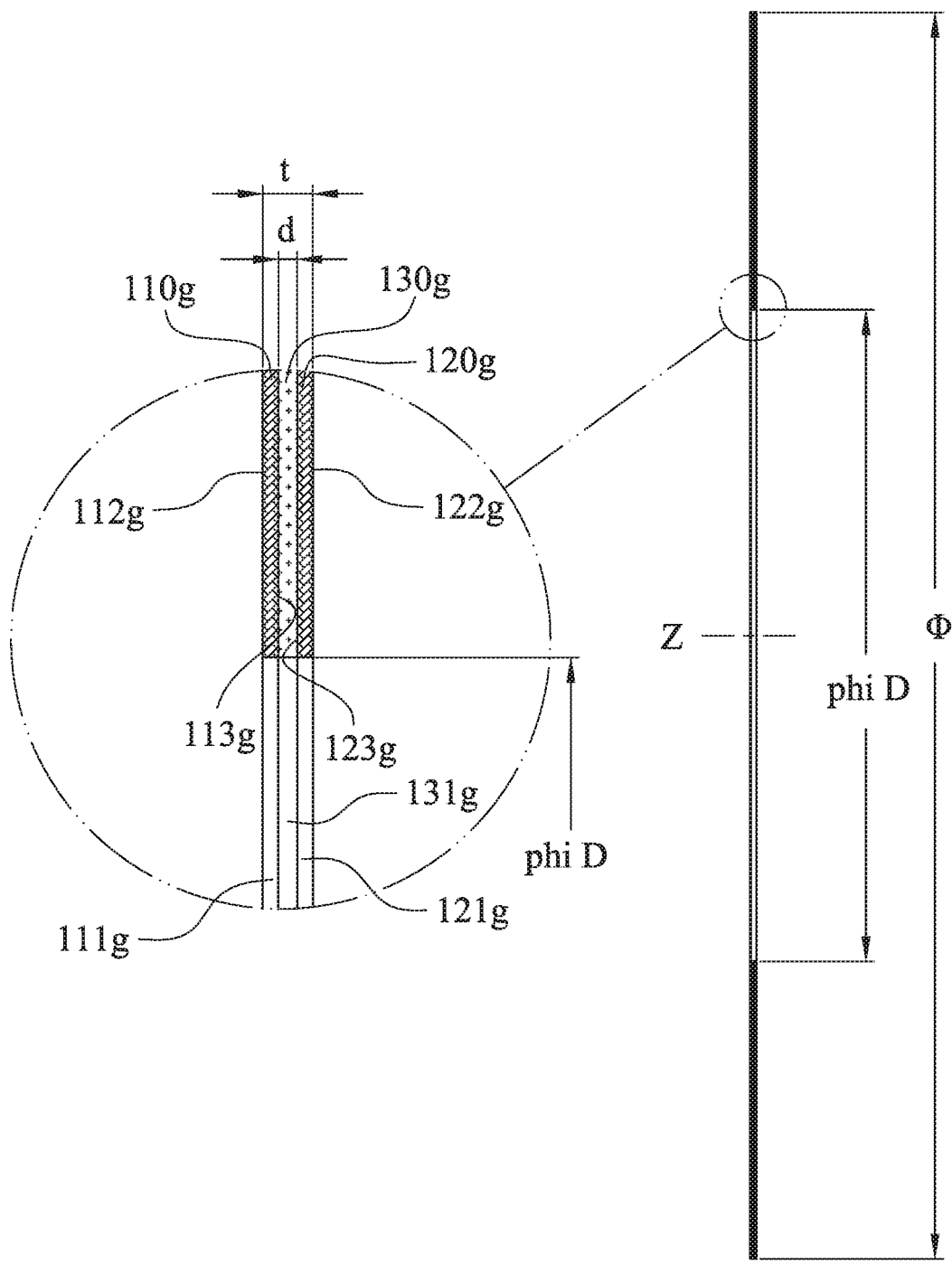
FIG. 5G is a cross-sectional view of a composite light blocking sheet according to a 7th example of the present disclosure.

FIG. 5G is a cross-sectional view of a composite light blocking sheet 100g according to a 7th example of the present disclosure, and a view angle of FIG. 5G is the same as that in FIG. 2C. The composite light blocking sheet 100g includes a first surface layer 110g, a second surface layer 120g, an inside substrate layer 130g and a central axis Z. The first surface layer 110g includes a first opening 111g, the second surface layer 120g includes a second opening 121g, and the inside substrate layer 130g includes a substrate opening 131g. The inside substrate layer 130g is disposed between the first surface layer 110g and the second surface layer 120g so as to connect the first surface layer 110g and the second surface layer 120g. The second opening 121g is disposed corresponding to the first opening 111g, and the substrate opening 131g is disposed corresponding to the first opening 111g and the second opening 121g. The central axis Z Is coaxial with the first opening 111g, the second opening 121g and the substrate opening 131g.

In particular, the first surface layer 110g includes a first outer surface 112g and a first inner surface 113g which are both connected to the first opening 111g. The second surface layer 120g includes a second outer surface 122g and a second inner surface 123g which are both connected to the second opening 121g. The first surface layer 110g is connected to the inside substrate layer 130g via the first inner surface 113g, and the second surface layer 120g is connected to the inside substrate layer 130g via the second inner surface 123g. Moreover, more than 95% of the first outer surface 112g has a first gloss being GU1, and more than 95% of the second outer surface 122g has a second gloss being GU2, wherein the first gloss GU1 is different from the second gloss GU2.

In the 7th example, the definitions of these parameters as shown in the following Table 7 are the same as those stated in the 1st example with corresponding values for the 7th example, so an explanation in this regard will not be provided again.

TABLE 7

| 7th Example | | | |
|---|---|---|---|
| d (mm) | 0.006 | phi D | 1.7 |
| t (mm) | 0.016 | GU1 (%) | 0.3 |
| d/t | 0.375 | GU2 (%) | 3.2 |
| Φ (mm) | 3.25 | GU2/GU1 | 10.67 |
| 1000 t/Φ | 4.923 | | |

8th Example

Figure 5H:
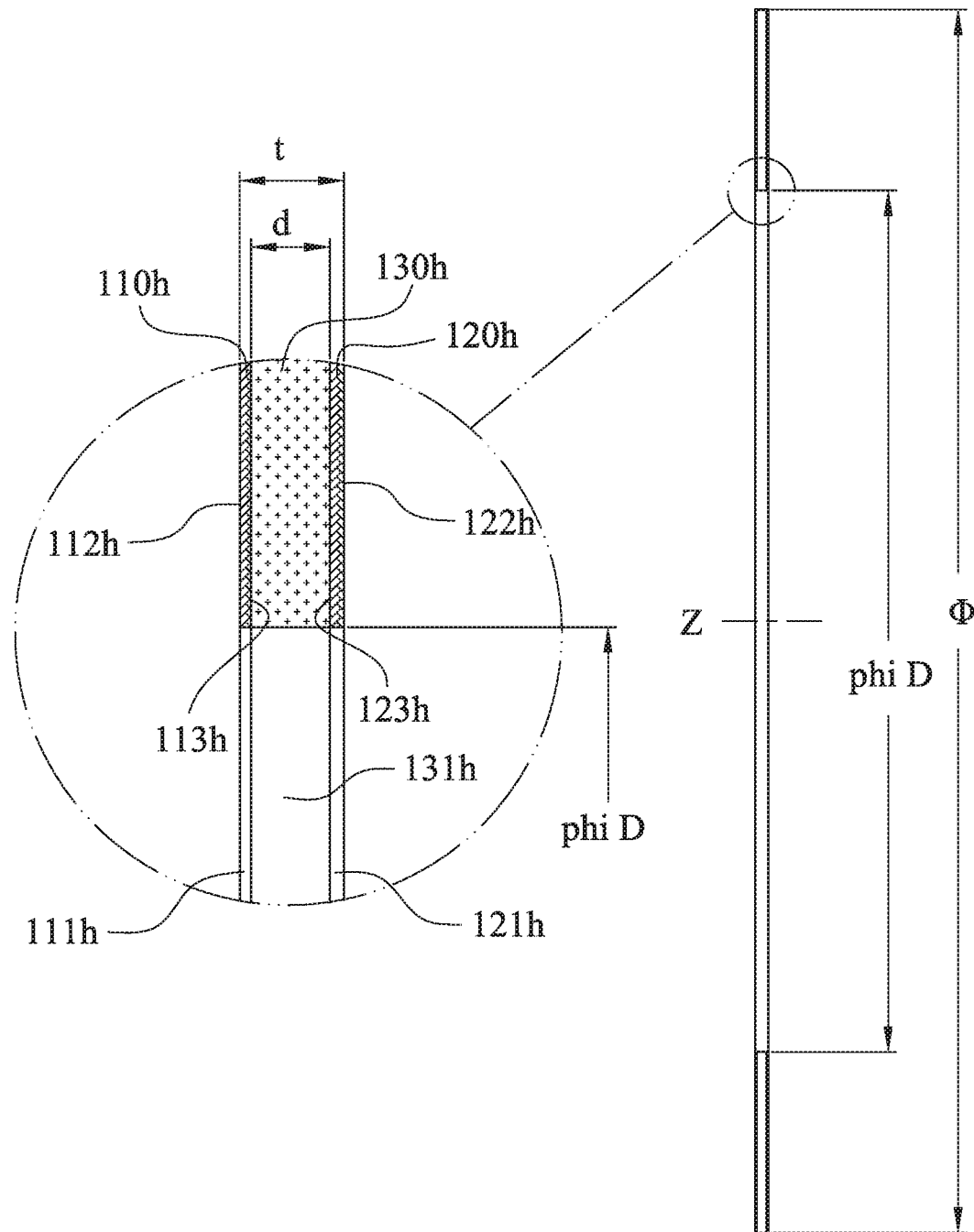
FIG. 5H is a cross-sectional view of a composite light blocking sheet according to an 8th example of the present disclosure.

FIG. 5H is a cross-sectional view of a composite light blocking sheet 100h according to an 8th example of the present disclosure, and a view angle of FIG. 5H is the same as that in FIG. 2C. The composite light blocking sheet 100h includes a first surface layer 110h, a second surface layer 120h, an inside substrate layer 130h and a central axis Z. The first surface layer 110h includes a first opening 111h, the second surface layer 120h includes a second opening 121h, and the inside substrate layer 130h includes a substrate opening 131h. The inside substrate layer 130h is disposed between the first surface layer 110h and the second surface layer 120h so as to connect the first surface layer 110h and the second surface layer 120h. The second opening 121h is disposed corresponding to the first opening 111h, and the substrate opening 131h is disposed corresponding to the first opening 111h and the second opening 121h. The central axis Z is coaxial with the first opening 111h, the second opening 121h and the substrate opening 131h.

In particular, the first surface layer 110h includes a first outer surface 112h and a first inner surface 113h which are both connected to the first opening 111h. The second surface layer 120h includes a second outer surface 122h and a second inner surface 123h which are both connected to the second opening 121h. The first surface layer 110h is connected to the inside substrate layer 130h via the first inner surface 113h, and the second surface layer 120h is connected to the inside substrate layer 130h via the second inner surface 123h. Moreover, more than 95% of the first outer surface 112h has a first gloss being GU1, and more than 95% of the second outer surface 122h has a second gloss being GU2, wherein the first gloss GU1 is different from the second gloss GU2.

In the 8th example, the definitions of these parameters as shown in the following Table 8 are the same as those stated in the 1st example with corresponding values for the 8th example, so an explanation in this regard will not be provided again.

TABLE 8

| 8th Example | | | |
|---|---|---|---|
| d (mm) | 0.028 | phi D | 2.5 |
| t (mm) | 0.037 | GU1 (%) | 0.7 |
| d/t | 0.757 | GU2 (%) | 3.4 |
| Φ (mm) | 3.55 | GU2/GU1 | 4.86 |
| 1000 t/Φ | 10.423 | | |

9th Example

Figure 6:
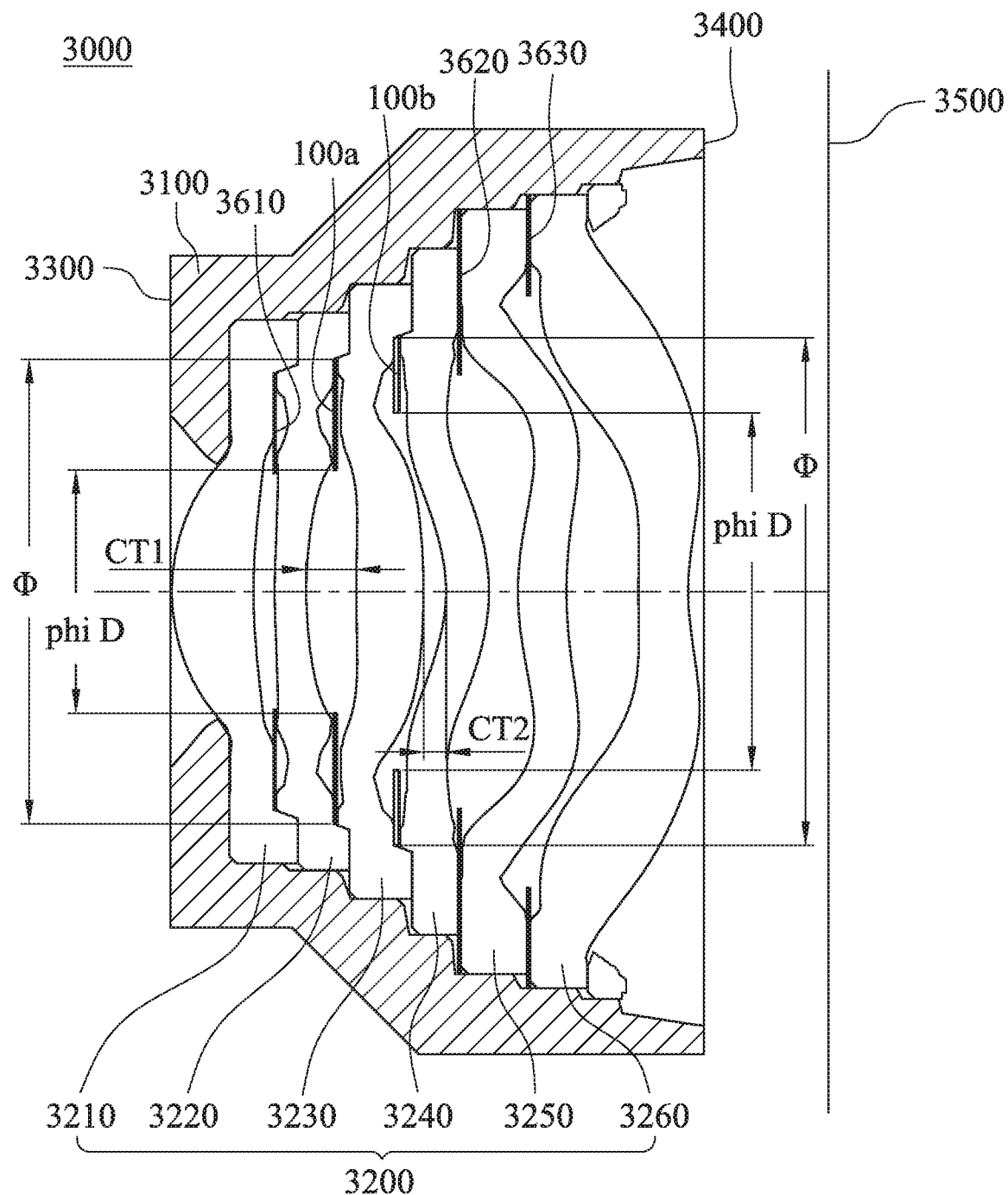
FIG. 6 is a schematic view of an imaging lens assembly according to a 9th example of the present disclosure.

FIG. 6 is a schematic view of an imaging lens assembly 3000 according to a 9th example of the present disclosure. In FIG. 6, the imaging lens assembly 3000 includes a barrel 3100, an optical lens set 3200 and two composite light blocking sheets. The two composite light blocking sheets are the composite light blocking sheet 100a of the 1st example as shown in FIG. 5A and the composite light blocking sheet 100b of the 2nd example as shown in FIG. 5B, respectively. The optical lens set 3200, the composite light blocking sheet 100a and the composite light blocking sheet 100b are all disposed in the barrel 3100 for providing a compact imaging lens assembly.

Specifically, the imaging lens assembly 3000 further includes an object-side end 3300, an image-side end 3400 and an image surface 3500. The object-side end 3300 faces an imaged object (not shown), and the image-side end 3400 faces the image surface 3500. More specifically, the optical lens set 3200 includes a first lens element 3210, a second lens element 3220, a third lens element 3230, a fourth lens element 3240, a fifth lens element 3250 and a sixth lens element 3260.

The composite light blocking sheet 100a is disposed between the second lens element 3220 and the third lens element 3230, and the composite light blocking sheet 100b is disposed between the third lens element 3230 and the fourth lens element 3240. A spacing element 3610 is disposed between the first lens element 3210 and the second lens element 3220. A spacing element 3620 is disposed between the fourth lens element 3240 and the fifth lens element 3250. A spacing element 3630 is disposed between the fifth lens element 3250 and the sixth lens element 3260.

The first outer surface 112a of the first surface layer 110a of the composite light blocking sheet 100a faces towards the object-side end 3300 of the imaging lens assembly 3000. The first outer surface 112b of the first surface layer 110b of the composite light blocking sheet 100b also faces towards the object-side end 3300 of the imaging lens assembly 3000. Therefore, the reflection of the stray lights can be reduced by correcting assembling the composite light blocking sheet 100a and the composite light blocking sheet 100b. Moreover, the assembling process of the imaging lens assembly 3000 can be simplified by unifiedly using the outer surfaces which has a lower gloss to face towards the object-side end 3300.

In the imaging lens assembly 3000 according to the 9th example, the parameters of the composite light blocking sheet 10a and the composite light blocking sheet 100b, such as d, t, d/t, φ, 1000 t/φ, phi D, GU1, GU2, and GU2/GU1, a distance on the central axis Z between the second lens element 3220 and the third lens element 3230 is CT1, a distance on the central axis Z between the third lens element 3230 and the fourth lens element 3240 is CT2, and a focal length of the imaging lens assembly 3000 is f. The values of d, t, d/t, φ, 1000 t/φ, phi D, f, f/phi D, CT1, CT2, CT1/t, CT2/t, GU1, GU2, and GU2/GU1 of the 9th example are listed in Table 9.

TABLE 9

| 9th Example f = 3.952 mm | | | |
|---|---|---|---|
| Composite light blocking sheet 100a | | | |
| d (mm) | 0.013 | f/phi D | 2.32 |
| t (mm) | 0.023 | CT1 (mm) | 0.351 |
| d/t | 0.565 | CT1/t | 15.26 |
| Φ (mm) | 3.25 | GU1 (%) | 0.6 |
| 1000 t/Φ | 7.077 | GU2 (%) | 8 |
| phi D | 1.7 | GU2/GU1 | 13.33 |
| Composite light blocking sheet 100b | | | |
| d (mm) | 0.032 | f/phi D | 1.58 |
| t (mm) | 0.041 | CT2 (mm) | 0.157 |
| d/t | 0.780 | CT2/t | 3.829 |
| Φ (mm) | 3.55 | GU1 (%) | 0.4 |
| 1000 t/Φ | 11.549 | GU2 (%) | 3 |
| phi D | 2.5 | GU2/GU1 | 7.5 |

10th Example

Figure 7:
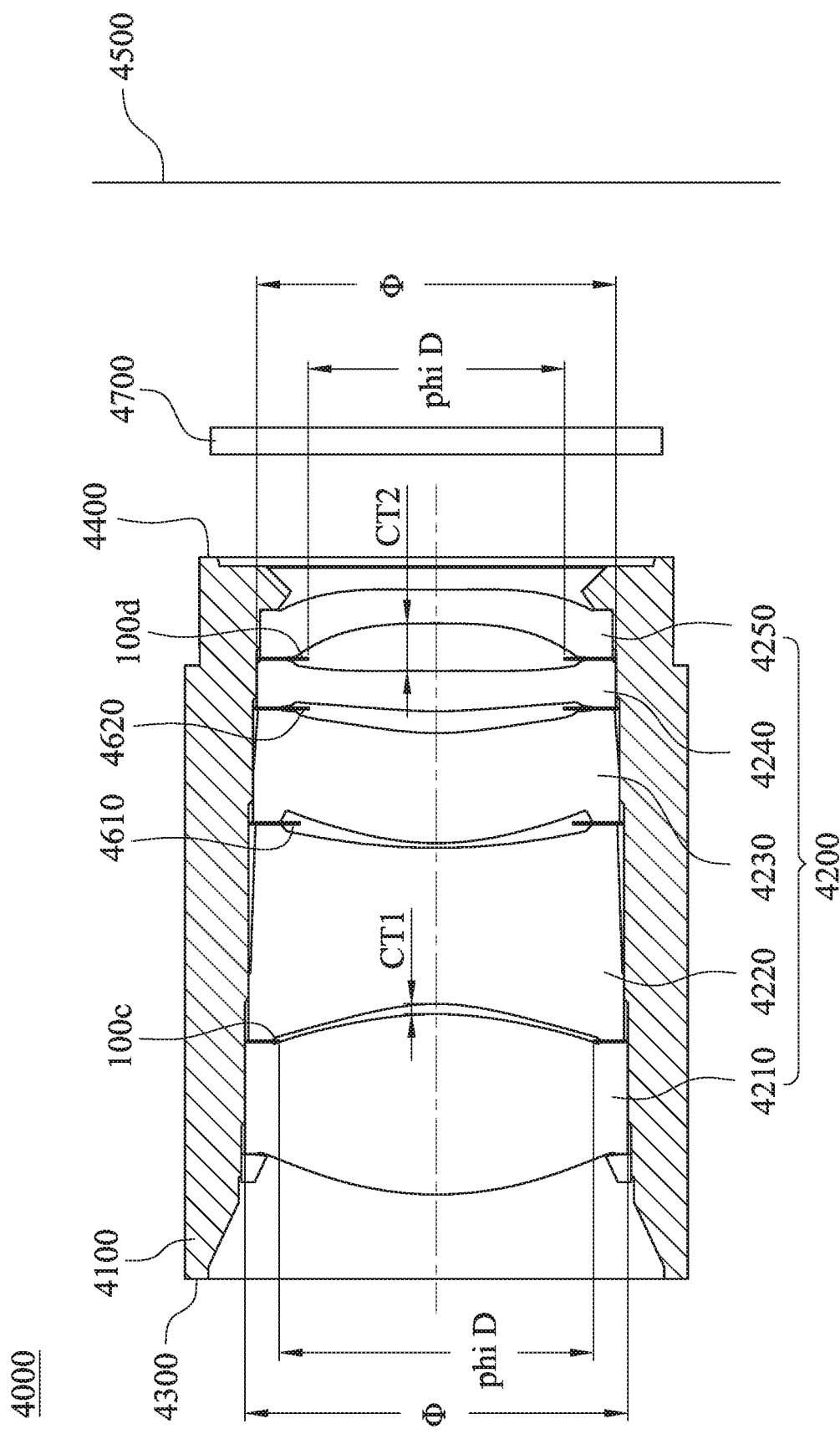
FIG. 7 is a schematic view of an imaging lens assembly according to a 10th example of the present disclosure.

FIG. 7 is a schematic view of an imaging lens assembly 4000 according to a 10th example of the present disclosure. In FIG. 7, the imaging lens assembly 4000 includes a barrel 4100, an optical lens set 4200 and two composite light blocking sheets. The two composite light blocking sheets are the composite light blocking sheet 100c of the 3rd example as shown in FIG. 5C and the composite light blocking sheet 100d of the 4th example as shown in FIG. 5D, respectively. The optical lens set 4200, the composite light blocking sheet 100c and the composite light blocking sheet 100d are all disposed in the barrel 4100 for providing a compact imaging lens assembly.

Specifically, the imaging lens assembly 4000 further includes an object-side end 4300, an image-side end 4400, and an image surface 4500. The object-side end 4300 faces an imaged object (not shown), and the image-side end 4400 faces the image surface 4500. More specifically, the optical lens set 4200 includes a first lens element 4210, a second lens element 4220, a third lens element 4230, a fourth lens element 4240, and a fifth lens element 4250.

The composite light blocking sheet 100c is disposed between the first lens element 4210 and the second lens element 4220, and the composite light blocking sheet 100*d* is disposed between the fourth lens element 4240 and the fifth lens element 4250. A spacing element 4610 is disposed between the second lens element 4220 and the third lens element 4230. A spacing element 4620 is disposed between the fourth lens element 4240 and the fifth lens element 4250.

The first outer surface 112*c* of the first surface layer 110*c* of the composite light blocking sheet 100*c* faces towards the object-side end 4300 of the imaging lens assembly 4000. The first outer surface 112*d* of the first surface layer 110*d* of the composite light blocking sheet 100*d* also faces towards the object-side end 4300 of the imaging lens assembly 4000. Therefore, the reflection of the stray lights can be reduced by correcting assembling the composite light blocking sheet 100*c* and the composite light blocking sheet 100*d*.

In the 10th example, the composite light blocking sheet 100*c* is not only applied for blocking light but also an aperture stop of the imaging lens assembly 4000. Therefore, the structure of the imaging lens assembly 4000 can be simplified. Moreover, the imaging lens assembly 4000 further includes a glass panel 4700, which is disposed between the image-side end 4400 and the image surface 4500. The glass panel 4700 can be cover glass, filter or both above, and will not affect a focal length of the imaging lens assembly 4000.

In the imaging lens assembly 4000 according to the 10th example, the parameters of the composite light blocking sheet 100*c* and the composite light blocking sheet 100*d*, such as d, t, d/t, Φ, 1000 t/Φ, phi D, GU1, GU2, and GU2/GU1, a distance on the central axis Z between the first lens element 4210 and the second lens element 4220 is CT1, a distance on the central axis Z between the fourth lens element 4240 and the fifth lens element 4250 is CT2, and the focal length of the imaging lens assembly 4000 is f. The values of d, t, d/t, Φ, 1000 t/Φ, phi D, f, f/phi D, CT1, CT2, CT1/t, CT2/t, GU1, GU2, and GU2/GU1 of the 10th example are listed in Table 10. It is clearly disclosed that the second gloss GU2 of the composite light blocking sheet 100*d* is facing the glass panel 4700 while the first gloss GU1 with a higher value than the second gloss GU2 of the composite light blocking sheet 100*d* is facing the object-side end 4300 of the imaging lens assembly 4000. In other words, the second surface layer 120*d* (shown in FIG. 5D) of the composite light blocking sheet 100*d* is facing the glass panel 4700 with a lower gloss. Such optical property configurations in the imaging lens assembly 4000 can be helpful for reducing surface reflection of a stray light (not shown) on the composite light blocking sheet 100*d* from the glass panel 4700 in the imaging lens assembly 4000.

TABLE 10

10th Example
f = 10.686 mm

Composite light blocking sheet 100c

| d (mm) | 0.013 | f/phi D | 3.07 |
|---|---|---|---|
| t (mm) | 0.023 | CT1 (mm) | 0.114 |
| d/t | 0.565 | CT1/t | 4.957 |
| Φ (mm) | 4.24 | GU1 (%) | 1.2 |
| 1000 t/Φ | 5.425 | GU2 (%) | 5.4 |
| phi D | 3.48 | GU2/GU1 | 4.5 |

Composite light blocking sheet 100d

| d (mm) | 0.013 | f/phi D | 3.763 |
|---|---|---|---|
| t (mm) | 0.023 | CT2 (mm) | 0.529 |
| d/t | 0.565 | CT2/t | 23 |

TABLE 10-continued

10th Example
f = 10.686 mm

| Φ (mm) | 3.98 | GU1 (%) | 7.6 |
|---|---|---|---|
| 1000 t/Φ | 5.779 | GU2 (%) | 0.9 |
| phi D | 2.84 | GU2/GU1 | 0.118 |

11th Example

Figure 8:
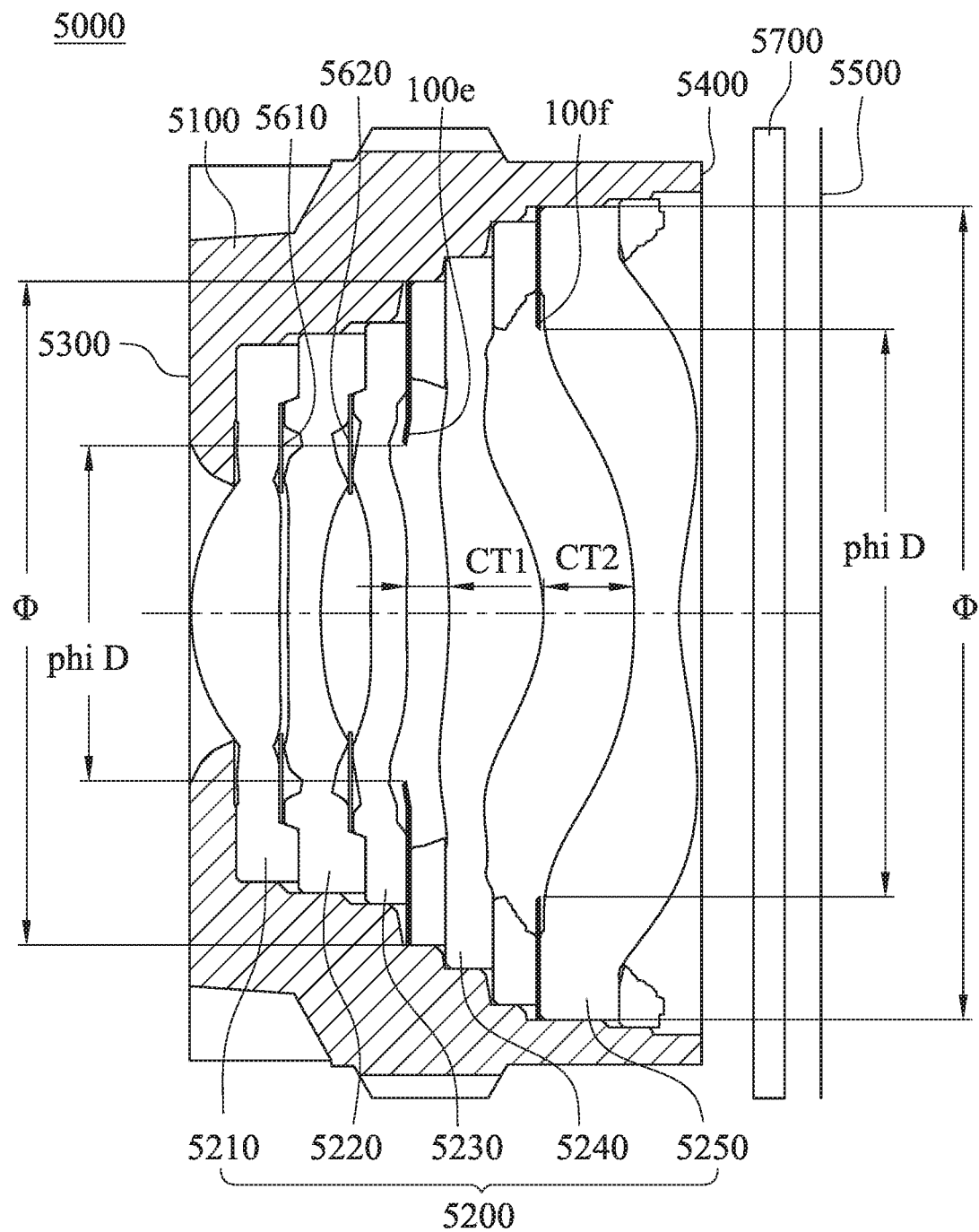
FIG. 8 is a schematic view of an imaging lens assembly according to an 11th example of the present disclosure.

FIG. 8 is a schematic view of an imaging lens assembly 5000 according to an 11th example of the present disclosure. In FIG. 8, the imaging lens assembly 5000 includes a barrel 5100, an optical lens set 5200 and two composite light blocking sheets. The two composite light blocking sheets are the composite light blocking sheet 100*e* of the 5th example as shown in FIG. 5E and the composite light blocking sheet 100*f* of the 6th example as shown in FIG. 5F, respectively. The optical lens set 5200, the composite light blocking sheet 100*e* and the composite light blocking sheet 100*f* are all disposed in the barrel 5100 for providing a compact imaging lens assembly.

Specifically, the imaging lens assembly 5000 further includes an object-side end 5300, an image-side end 5400, and an image surface 5500. The object-side end 5300 faces an imaged object (not shown), and the image-side end 5400 faces the image surface 5500. More specifically, the optical lens set 5200 includes a first lens element 5210, a second lens element 5220, a third lens element 5230, a fourth lens element 5240, and a fifth lens element 5250.

The composite light blocking sheet 100*e* is disposed between the third lens element 5230 and the fourth lens element 5240, and the composite light blocking sheet 100*f* is disposed between the fourth lens element 5240 and the fifth lens element 5250. A spacing element 5610 is disposed between the first lens element 5210 and the second lens element 5220. A spacing element 5620 is disposed between the second lens element 5220 and the third lens element 5230.

The first outer surface 112*e* of the first surface layer 110*e* of the composite light blocking sheet 100*e* faces towards the object-side end 5300 of the imaging lens assembly 5000. The first outer surface 112*f* of the first surface layer 110*f* of the composite light blocking sheet 100*f* also faces towards the object-side end 5300 of the imaging lens assembly 5000. Therefore, the reflection of the stray lights can be reduced by correcting assembling the composite light blocking sheet 100*e* and the composite light blocking sheet 100*f*.

In the 11th example, the imaging lens assembly 5000 further includes a glass panel 5700, which is disposed between the image-side end 5400 and the image surface 5500. The glass panel 5700 can be cover glass, filter or both above, and will not affect a focal length of the imaging lens assembly 5000.

In the imaging lens assembly 5000 according to the 11th example, the parameters of the composite light blocking sheet 100*e* and the composite light blocking sheet 100*f*, such as d, t, d/t, φ, 1000 t/φ, phi D, GU1, GU2, and GU2/GU1, a distance on the central axis Z between the third lens element 5230 and the fourth lens element 5240 is CT1, a distance on the central axis Z between the fourth lens element 5240 and the fifth lens element 5250 is CT2, and the focal length of the imaging lens assembly 5000 is f. The values of d, t, d/t, φ, 1000 t/φ, phi D, f, f/phi D, CT1, CT2, CT1/t, CT2/t, GU1, GU2, and GU2/GU1 of the 11th example are listed in Table 11.

TABLE 11

11th Example
f = 3.57 mm

Composite light blocking sheet 100e

| | | | |
|---|---|---|---|
| d (mm) | 0.014 | f/phi D | 1.566 |
| t (mm) | 0.024 | CT1 (mm) | 0.284 |
| d/t | 0.583 | CT1/t | 11.833 |
| Φ (mm) | 4.45 | GU1 (%) | 0.8 |
| 1000 t/Φ | 5.393 | GU2 (%) | 3.8 |
| phi D | 2.28 | GU2/GU1 | 4.75 |

Composite light blocking sheet 100f

| | | | |
|---|---|---|---|
| d (mm) | 0.013 | f/phi D | 0.932 |
| t (mm) | 0.023 | CT2 (mm) | 0.607 |
| d/t | 0.565 | CT2/t | 26.391 |
| Φ (mm) | 5.45 | GU1 (%) | 0.9 |
| 1000 t/Φ | 4.22 | GU2 (%) | 6.8 |
| phi D | 3.83 | GU2/GU1 | 7.56 |

12th Example

Figure 9:
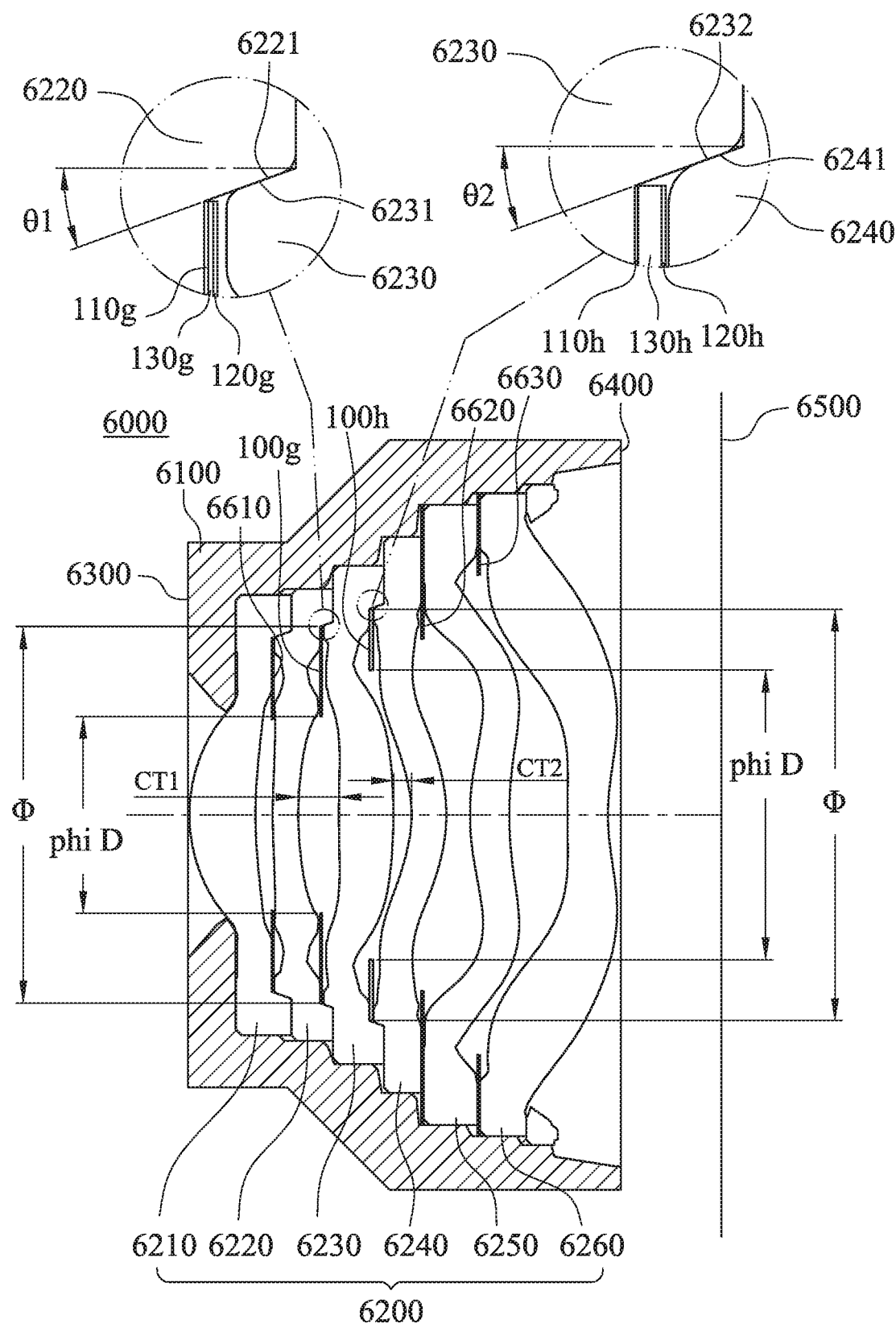
FIG. 9 is a schematic view of an imaging lens assembly according to a 12th example of the present disclosure.

FIG. 9 is a schematic view of an imaging lens assembly 6000 according to a 12th example of the present disclosure. In FIG. 9, the imaging lens assembly 6000 includes a barrel 6100, an optical lens set 6200 and two composite light blocking sheets. The two composite light blocking sheets are the composite light blocking sheet 100g of the 7th example as shown in FIG. 5G and the composite light blocking sheet 100h of the 8th example as shown in FIG. 5H, respectively. The optical lens set 6200, the composite light blocking sheet 100g and the composite light blocking sheet 100h are all disposed in the barrel 6100 for providing a compact imaging lens assembly.

Specifically, the imaging lens assembly 6000 further includes an object-side end 6300, an image-side end 6400, and an image surface 6500. The object-side end 6300 faces an imaged object (not shown), and the image-side end 6400 faces the image surface 6500. More specifically, the optical lens set 6200 includes a first lens element 6210, a second lens element 6220, a third lens element 6230, a fourth lens element 6240, a fifth lens element 6250, and a sixth lens element 6260.

The composite light blocking sheet 100g is disposed between the second lens element 6220 and the third lens element 6230, and the composite light blocking sheet 100h is disposed between the third lens element 6230 and the fourth lens element 6240. A spacing element 6610 is disposed between the first lens element 6210 and the second lens element 6220. A spacing element 6620 is disposed between the fourth lens element 6240 and the fifth lens element 6250. A spacing element 6630 is disposed between the fifth lens element 6250 and the sixth lens element 6260.

The first outer surface 112g of the first surface layer 110g of the composite light blocking sheet 100g faces towards the object-side end 6300 of the imaging lens assembly 6000. The first outer surface 112h of the first surface layer 110h of the composite light blocking sheet 100h also faces towards the object-side end 6300 of the imaging lens assembly 6000. Therefore, the reflection of the stray lights can be reduced by correcting assembling the composite light blocking sheet 100g and the composite light blocking sheet 100h.

In addition, as shown in a partial enlarged diagram of FIG. 9, the second lens element 6220 has an axial connecting surface 6221, and the third lens element 6230 has an axial connecting surface 6231 for assembling with the second lens element 6220 so as to align a center of the second lens element 6220 to a center of the third lens element 6230. Preferably, an angle between each of the axial connecting surface 6221 and the axial connecting surface 6231 and the central axis Z is θ1, wherein θ1 is 20 degrees. Therefore, the composite light blocking sheet 100g can be easily assembled with the second lens element 6220 and the third lens element 6230. Furthermore, the third lens element 6230 has another axial connecting surface 6232, and the fourth lens element 6240 has an axial connecting surface 6241 for assembling with the third lens element 6230 so as to align a center of the third lens element 6230 to a center of the fourth lens element 6240. Preferably, an angle between each of axial connecting surface 6232 and the axial connecting surface 6241 and the central axis Z is θ2, wherein θ2 is 20 degrees. Therefore, the composite light blocking sheet 100h can be easily assembled with the third lens element 6230 and the fourth lens element 6240.

In the imaging lens assembly 6000 according to the 12th example, the parameters of the composite light blocking sheet 100g and the composite light 5i blocking sheet 100h, such as d, t, d/t, φ, 1000 t/φ, phi D, GU1, GU2, and GU2/GU1, a distance on the central axis Z between the second lens element 6220 and the third lens element 6230 is CT1, a distance on the central axis Z between the third lens element 6230 and the fourth lens element 6240 is CT2, and a focal length of the imaging lens assembly 6000 is f. The values of d, t, d/t, φ, 1000 t/φ, phi D, f, f/phi D, CT1, CT2, CT1/t, CT2/t, GU1, GU2, and GU2/GU1 of the 12th example are listed in Table 12.

TABLE 12

12th Example
f = 3.954 mm

Composite light blocking sheet 100g

| | | | |
|---|---|---|---|
| d (mm) | 0.006 | f/phi D | 2.356 |
| t (mm) | 0.016 | CT1 (mm) | 0.351 |
| d/t | 0.375 | CT1/t | 21.938 |
| Φ (mm) | 3.25 | GU1 (%) | 0.3 |
| 1000 t/Φ | 4.923 | GU2 (%) | 3.2 |
| phi D | 1.7 | GU2/GU1 | 10.67 |

Composite light blocking sheet 100h

| | | | |
|---|---|---|---|
| d (mm) | 0.028 | f/phi D | 1.582 |
| t (mm) | 0.037 | CT2 (mm) | 0.157 |
| d/t | 0.757 | CT2/t | 4.243 |
| Φ (mm) | 3.55 | GU1 (%) | 0.7 |
| 1000 t/Φ | 10.423 | GU2 (%) | 3.4 |
| phi D | 2.5 | GU2/GU1 | 4.86 |

13th Example

Figure 10:
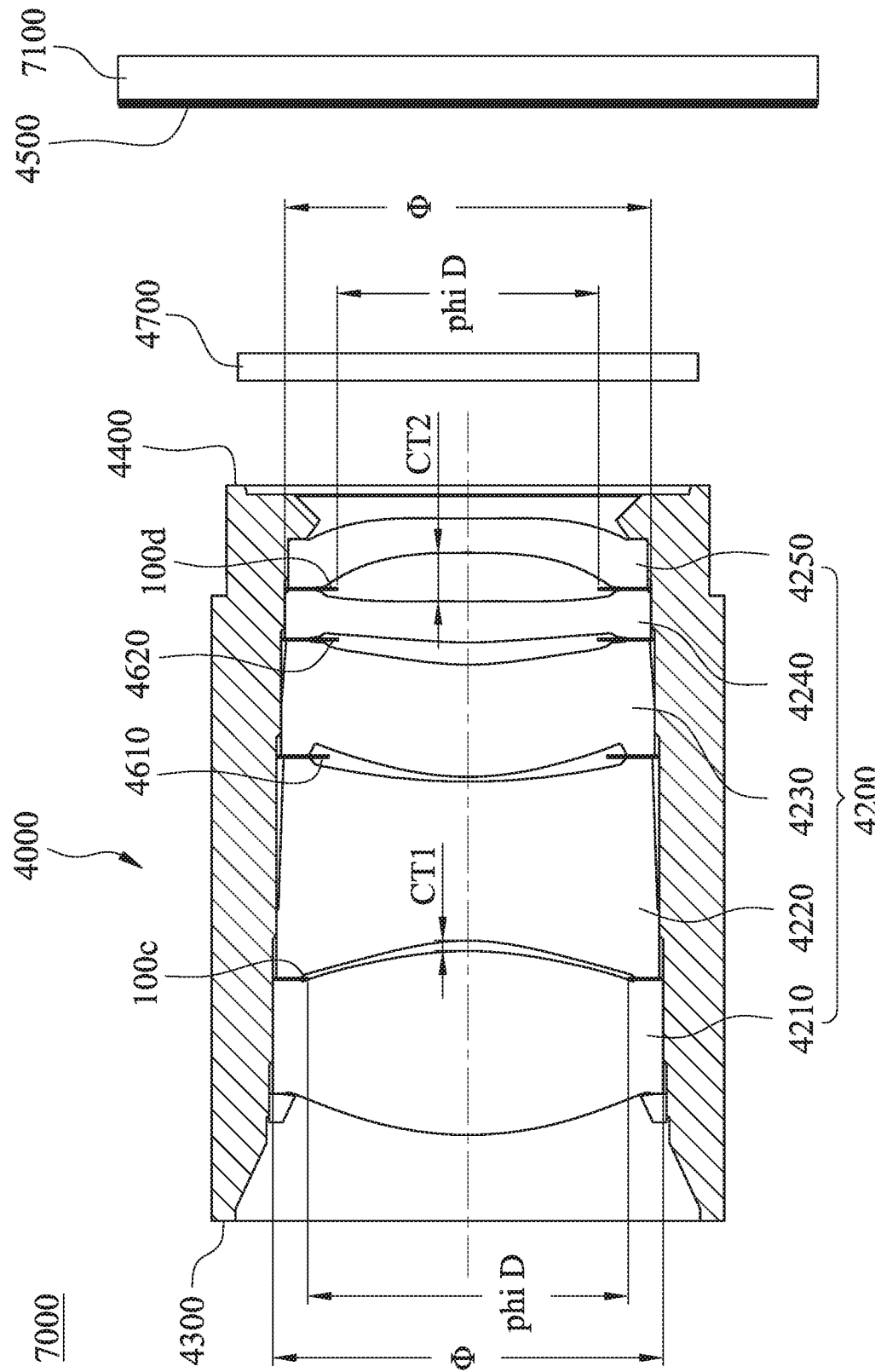
FIG. 10 is a schematic view of an electronic device according to a 13th example of the present disclosure.

FIG. 10 is a schematic view of an electronic device 7000 according to a 13th example of the present disclosure. In FIG. 10, the electronic device includes the imaging lens assembly 4000 and an image sensor 7100. In particular, the imaging lens assembly 4000 includes the barrel 4100, the optical lens set 4200 and the two composite light blocking sheets. The two composite light blocking sheets are the composite light blocking sheet 100c of the 3rd example as shown in FIG. 5C and the composite light blocking sheet 100d of the 4th example as shown in FIG. 5D, respectively. The optical lens set 4200, the composite light blocking sheet 100c and the composite light blocking sheet 100d are all disposed in the barrel 4100 for providing a compact imaging lens assembly.

The imaging lens assembly 4000 further includes the object-side end 4300, the image-side end 4400, and the image surface 4500. The object-side end 4300 faces the imaged object (not shown), and the image-side end 4400 faces the image surface 4500. Moreover, an image sensor 7100 is disposed on the image surface 4500 of the imaging lens assembly 4000.

In particular, the optical lens set 4200 includes the first lens element 4210, the second lens element 4220, the third lens element 4230, the fourth lens element 4240, and the fifth lens element 4250. More particularly, the composite light blocking sheet 100c is disposed between the first lens element 4210 and the second lens element 4220, and the composite light blocking sheet 100d is disposed between the fourth lens element 4240 and the fifth lens element 4250. The spacing element 4610 is disposed between the second lens element 4220 and the third lens element 4230. The spacing element 4620 is disposed between the fourth lens element 4240 and the fifth lens element 4250.

The first outer surface 112c of the first surface layer 110c of the composite light blocking sheet 100c faces towards the object-side end 4300 of the imaging lens assembly 4000. The first outer surface 112d of the first surface layer 110d of the composite light blocking sheet 100d also faces towards the object-side end 4300 of the imaging lens assembly 4000. Therefore, the reflection of the stray lights can be reduced by correcting assembling the composite light blocking sheet 100c and the composite light blocking sheet 100d.

In addition, the composite light blocking sheet 100c is the aperture stop of the imaging lens assembly 4000. Therefore, the structure of the imaging lens assembly 4000 can be simplified. Moreover, the imaging lens assembly 4000 further includes the glass panel 4700, which is disposed between the image-side end 4400 and the image surface 4500. The glass panel 4700 can be cover glass, filter or both above, and will not affect the focal length of the imaging lens assembly 4000.

The parameters and the corresponding values of the composite light blocking sheet 100c and the composite light blocking sheet 100d, such as d, t, d/t, ϕ, 1000 t/ϕ, phi D, GU1, GU2, and GU2/GU1, the distance on the central axis Z (CT1) between the first lens element 4210 and the second lens element 4220, the distance on the central axis Z (CT2) between the fourth lens element 4240 and the fifth lens element 4250, and the focal length (f) of the imaging lens assembly 4000 are referred to Table 10. Thus, there is no further description herein.

14th Example

Figure 11:
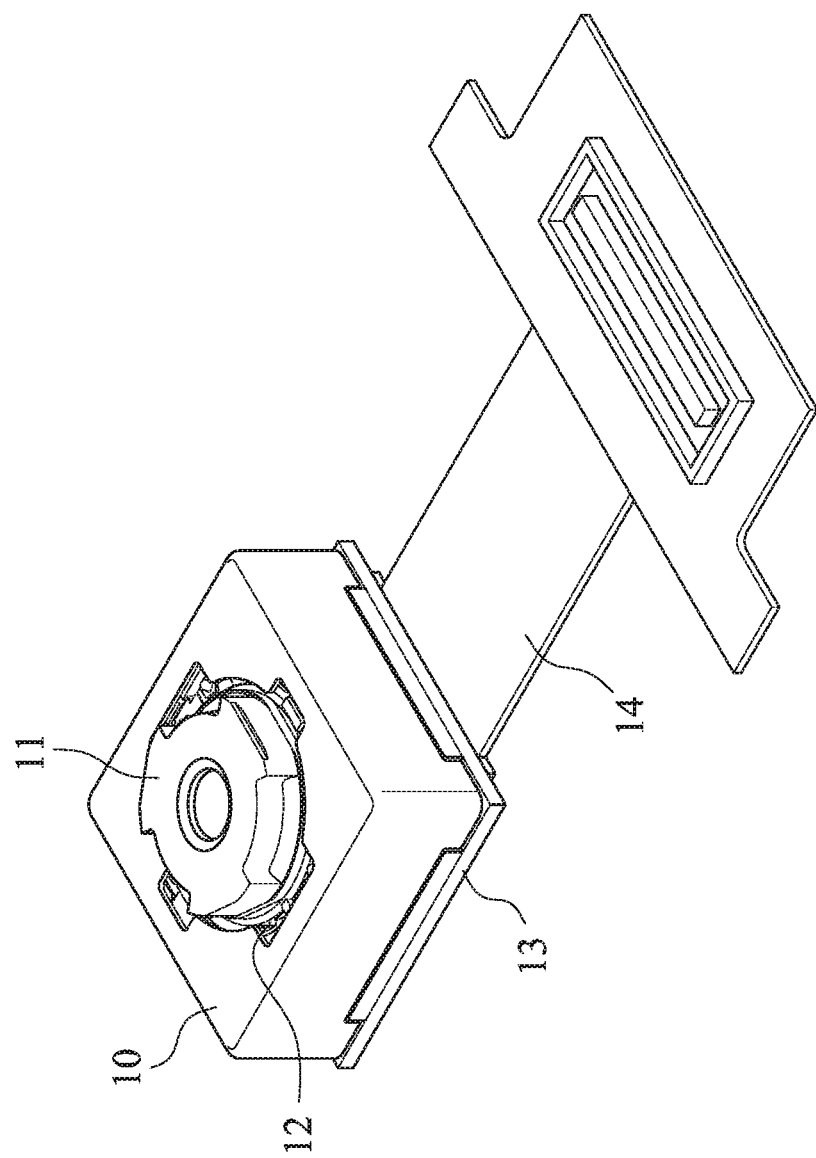
FIG. 11 is a schematic view of an image capturing device according to a 14th example of the present disclosure.

FIG. 11 is a schematic view of an Image capturing device 10 according to a 14th example of the present disclosure. The image capturing device 10 of the 14th example is a camera module. The image capturing device 10 includes an imaging lens assembly 11, a driving assembly 12, an image sensor 13 and a conductor circuit 14. The imaging lens assembly 11 can be an imaging lens assembly (not shown herein) according to any one of the 9th example, the 10th example, the 11th example and the 12th example. In the image capturing device 10, lights are focused by the imaging lens assembly 11 for generating an image, the driving assembly 12 is used to assist the imaging lens assembly 11 into focus, then the image is formed on the image sensor 13, and the data of the image is outputted by the conductor circuit 14.

The driving assembly 12 can be an auto-focus module, and a driving method thereof can use a voice coil motor (VCM), a micro electro-mechanical system (MEMS), a piezoelectric system or a shape memory alloy system. The driving assembly 12 enables the imaging lens assembly 11 to obtain a preferable imaging position, so that the imaged object in different object distances can be imaged clearly. Moreover, the driving assembly 12 can be coordinated with a kinetic energy sensing element, such as an accelerator, a gyro or a Hall effect sensor. By adjusting the changes in different axial directions of the optical lens set, the blurry image resulting in the shaking of the shooting moment can be compensated, so that the image quality of dynamic scenes or low-light scenes can be enhanced. For example, an optical Image stabilization (OIS) or an electronic image stabilization (EIS) can be featured with the driving assembly 12. Moreover, the image sensor 13 of the image capturing device 10 disposed on the image surface of the imaging lens assembly 11 can have the properties of high light sensitivity and low noise (such as CMOS and CCD), so that the excellent image quality of the imaging lens assembly 11 can be truly presented.

In practical, the image capturing device 10 can be connected with other modules, such as a flash module (not shown herein) or an auxiliary focusing module (not shown herein) for giving the image capturing device 10 required functions. Moreover, the image capturing device 10 can be connected with only one module or can be connected with a plurality of modules. The conductor circuit 14 can be but is not limited to a flexible printing circuit (FPC).

15th Example

Figure 12A:
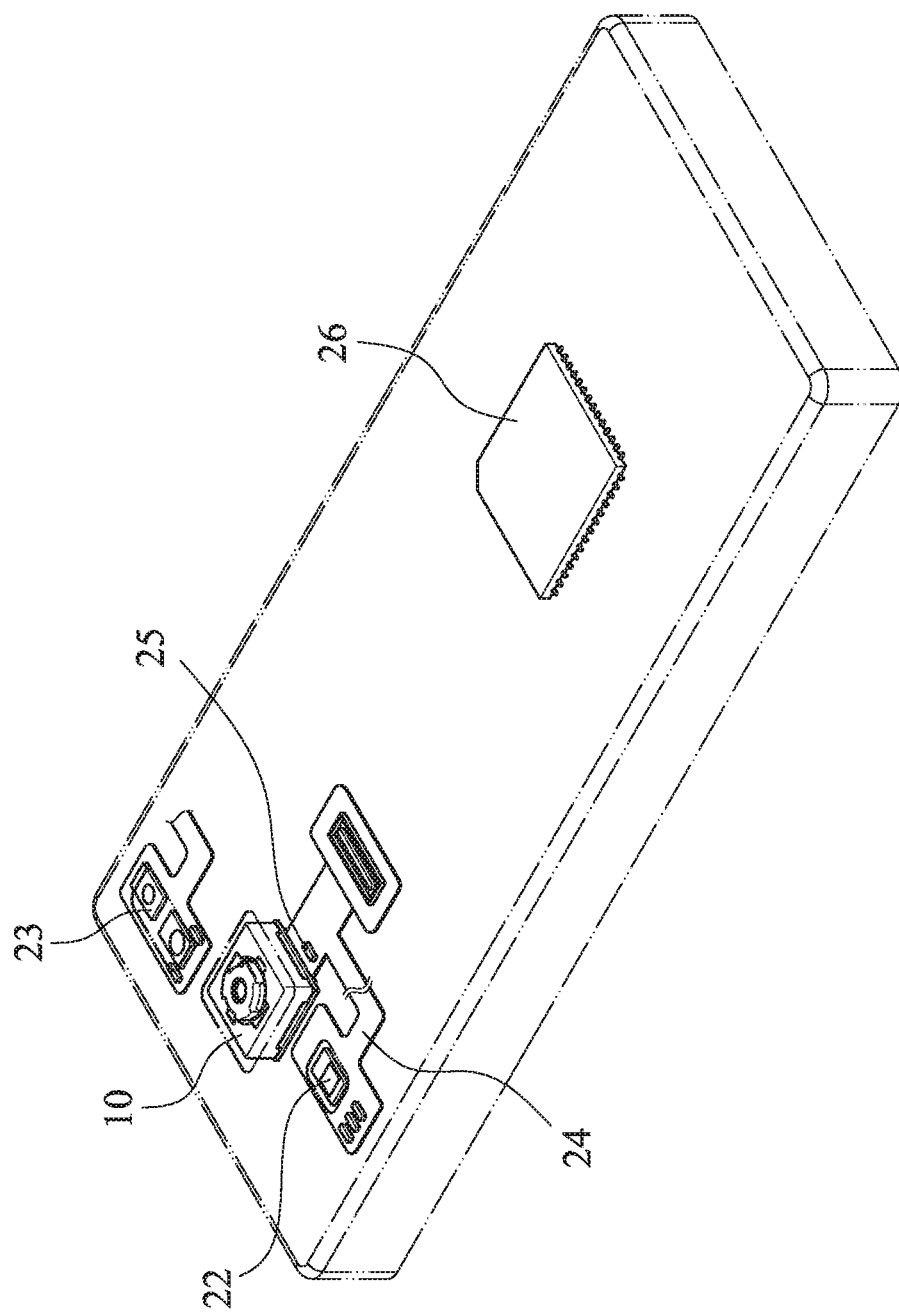
FIG. 12A is a perspective schematic view of an electronic device according to a 15th example of the present disclosure.
Figure 12B:
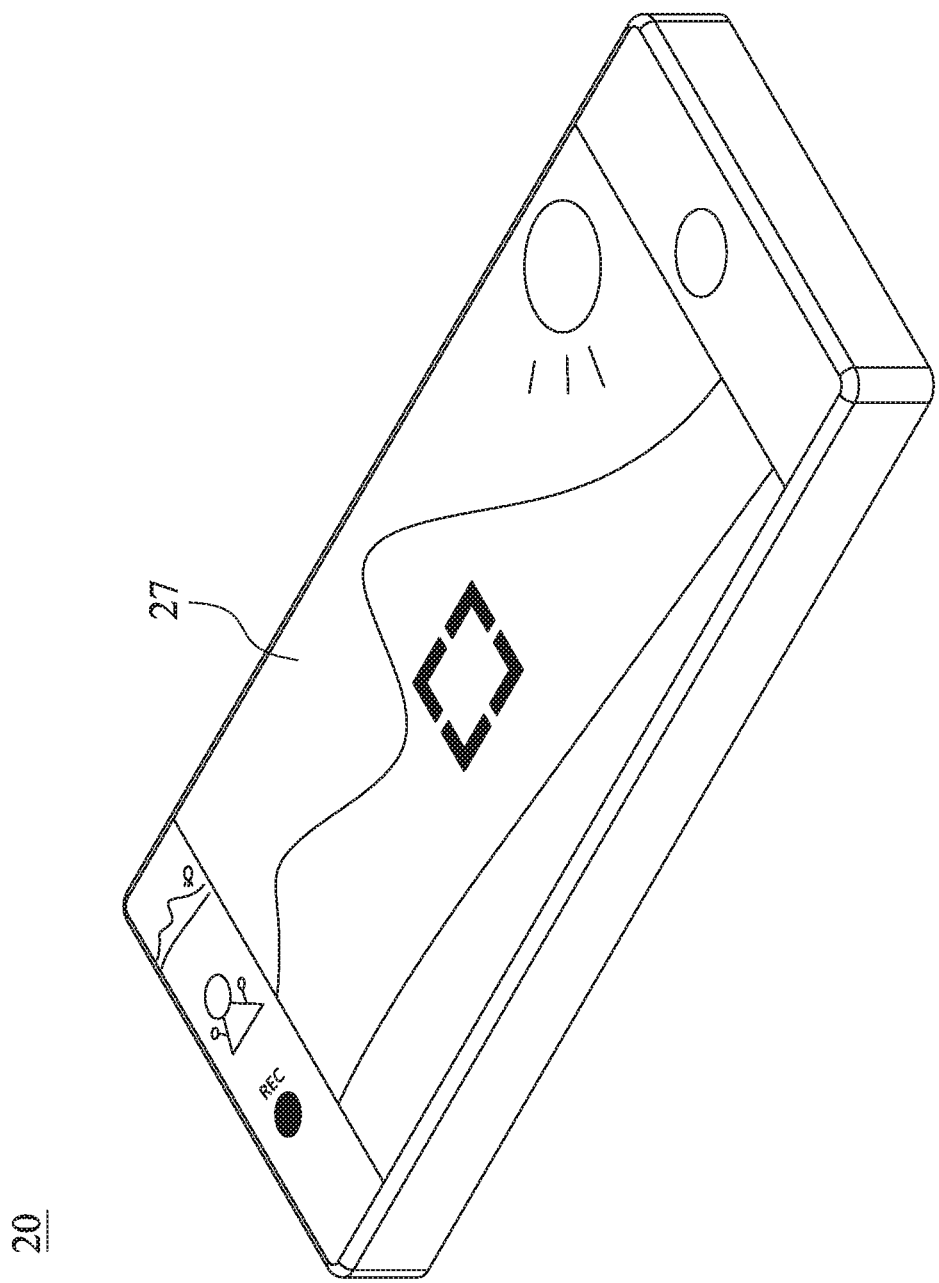
FIG. 12B is a schematic view of the electronic device in FIG. 12A from another view angle.

FIG. 12A is a perspective schematic view of an electronic device 20 according to a 15th example of the present disclosure, and FIG. 12B is a schematic view of the electronic device 20 in FIG. 12A from another view angle. The electronic device 20 of the 15th example is a smart phone. The electronic device 20 includes the image capturing device 10 of the 14th example, a flash module 22, an auxiliary focusing module 23, a conductor circuit 24, a sensor 25, an image signal processor 26, and a user interface 27 (shown in FIG. 12B). The image capturing device 10 is electrically connected with the flash module 22, the auxiliary focusing module 23, the conductor circuit 24, the sensor 25, the image signal processor 26 and the user interface 27. When a user shoots with the electronic device 20 via the user interface 27, lights are focused by the image capturing device 10 for generating an image, a light compensation function is provided by the flash module 22, the object distance of the imaged objected is provided by the auxiliary focusing module 23 for focusing quickly, and an optimizing image processing is provided by the image signal processor 26, so that the image quality can be further enhanced. The auxiliary focusing module 23 can adopt an infrared auxiliary focusing system or a laser auxiliary focusing system for focusing quickly. The conductor circuit 24 can be but is not limited to a flexible printing circuit (FPC). The sensor 25 can be but not limited to an accelerometer or a gyroscope. The user interface 27 can adopt a touch screen or a physical shooting button, and an image processing software can be coordinated with the user interface 27 for providing a variety of shooting modes and a variety of image processing. As mentioned above, the electronic device 20 of the 15th example also can be coordinated with a kinetic energy sensing element, such as an accelerator, a gyro or a Hall effect sensor. By adjusting the changes in different axial directions of the optical lens set, the blurry image resulting in the shaking of the shooting moment can be compensated, so that the image quality of dynamic scenes or low-light scenes can be enhanced. For example, an optical image stabilization (OIS) or an electronic image stabilization (EIS) can be featured with the driving assembly 12. Thus, the electronic device 20 can be operated with multiple modes, such as optimized self-timer mode, low light HDR, high definition (4 k) video, and so on.

16th Example

Figure 13:
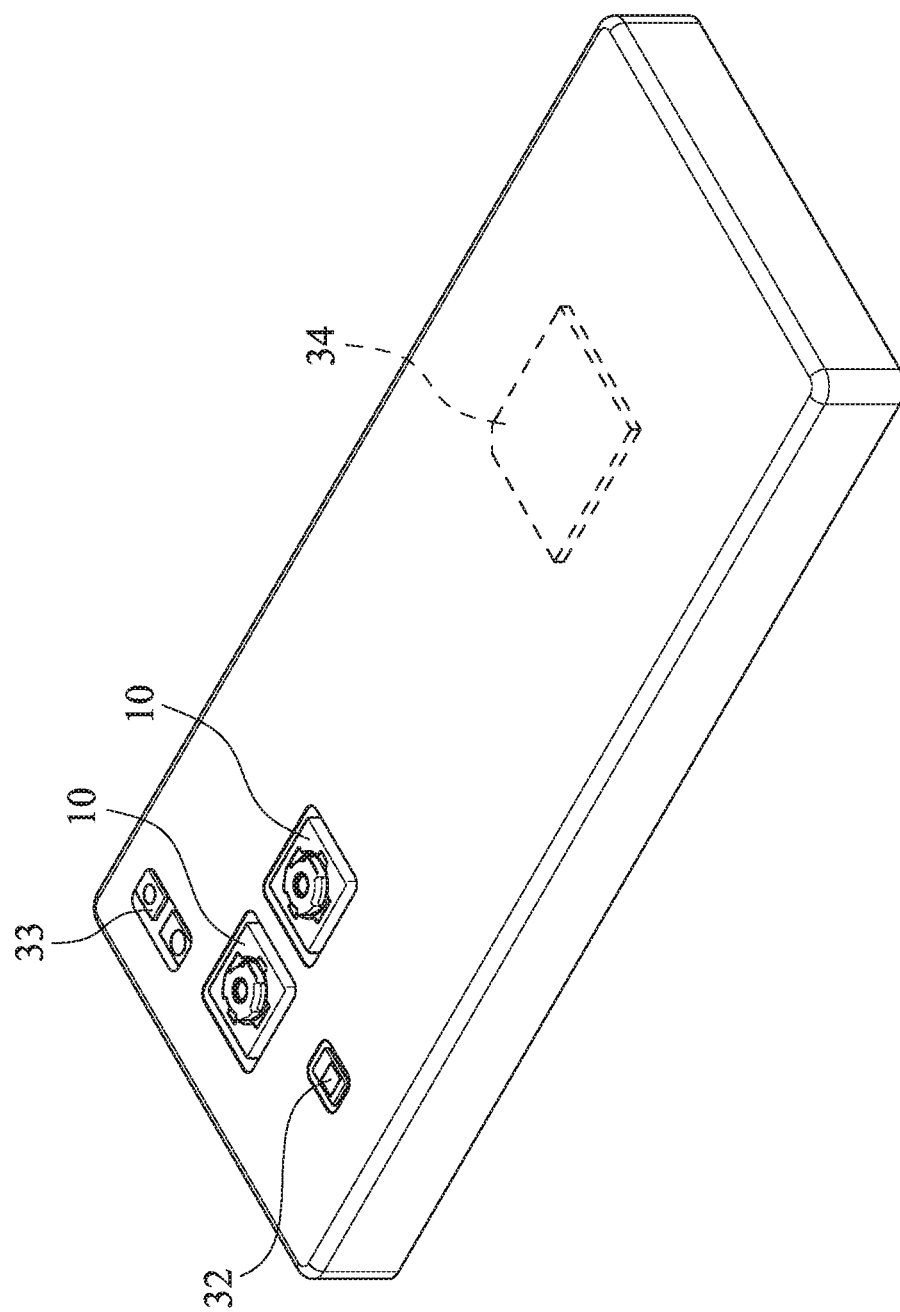
FIG. 13 is a perspective schematic view of an electronic device according to a 16th example of the present disclosure.

FIG. 13 is a perspective schematic view of an electronic device 30 according to a 16th example of the present disclosure. The electronic device of the 16th example is a smart phone. The electronic device 30 includes two image capturing devices 10 of the 14th example, a flash module 32, an auxiliary focusing module 33, and an image signal processor 34. That is, the electronic device 30 has a dual imaging lens assembly.

In particular, the two image capturing devices 10 are electrically connected with the flash module 32, the auxiliary focusing module 33, and the image signal processor 34. When a user shoots with the electronic device 30 via an user interface, which is not shown herein but similar to the user interface 25 as shown in FIG. 12B, lights are focused by the image capturing devices 10 for generating an image, a light compensation function is provided by the flash module 32, the object distance of the imaged objected is provided by the auxiliary focusing module 33 for focusing quickly, and an optimizing image processing is provided by the image signal processor 34, so that the image quality can be further enhanced. The auxiliary focusing module 33 can adopt an infrared auxiliary focusing system or a laser auxiliary focusing system for focusing quickly. The user interface can adopt a touch screen or a physical shooting button, and an image processing software can be coordinated with the user interface for providing a variety of shooting modes and a variety of image processings.

17th Example

Figure 14:
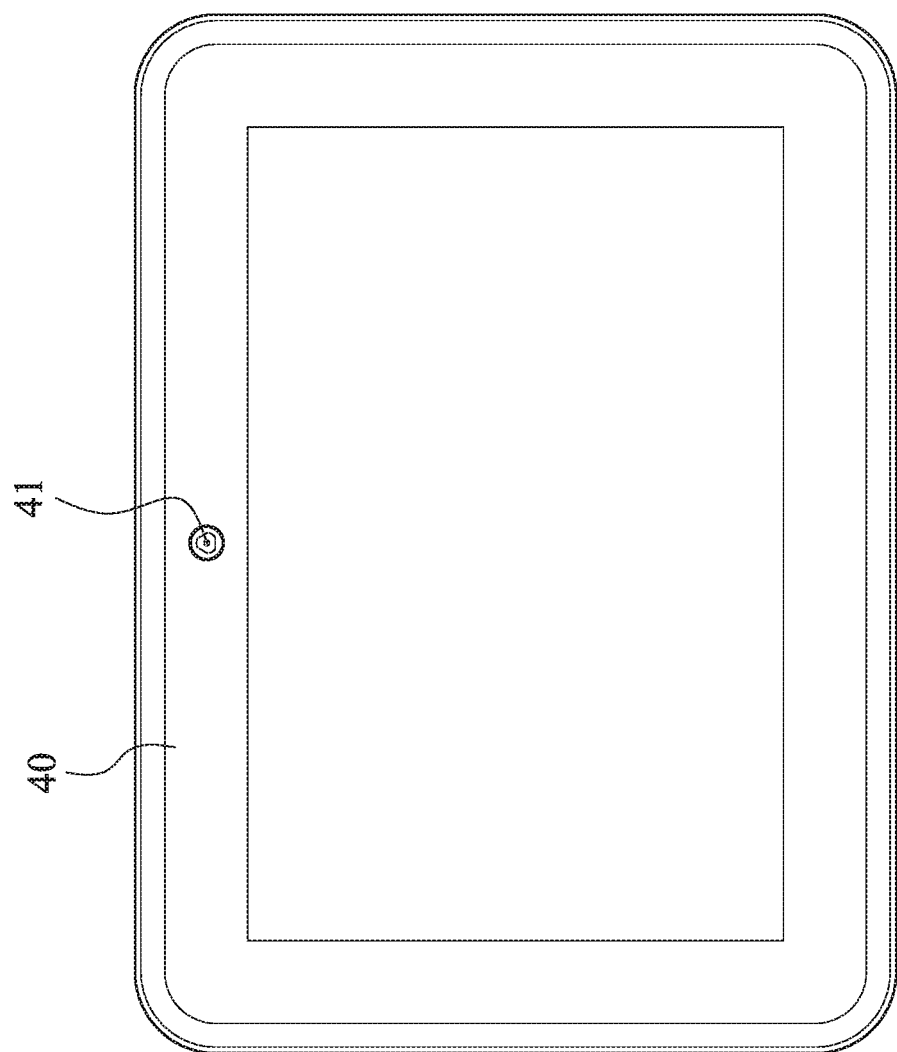
FIG. 14 is a schematic view of an electronic device according to the 17th example of the present disclosure.

FIG. 14 is a schematic view of an electronic device 40 according to the 17th example of the present disclosure. In FIG. 14, the electronic device 40 of the 17th embodiment is a tablet personal computer. The electronic device 40 includes an image capturing device 41. The image capturing device 41 can be the same as that of the 14th example, and will not be repeated herein.

18th Example

Figure 15:
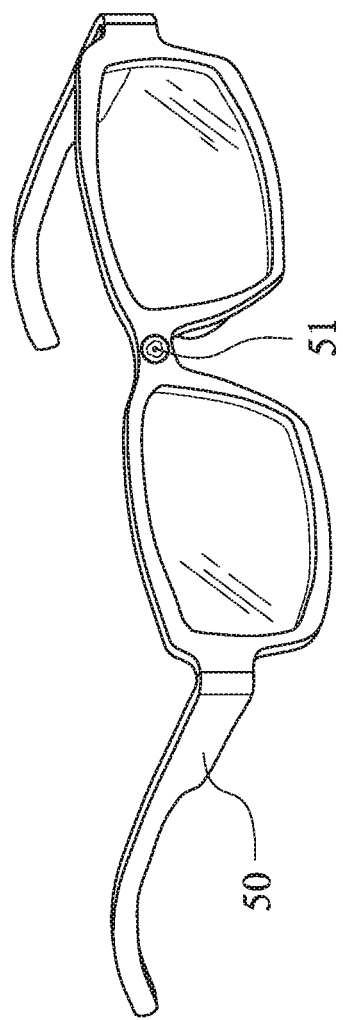
FIG. 15 is a schematic view of an electronic device according to the 18th example of the present disclosure.

FIG. 15 is a schematic view of an electronic device 50 according to the 18th example of the present disclosure. In FIG. 15, the electronic device 50 of the 18th embodiment is a head-mounted display (HMD). The electronic device 50 includes an image capturing device 51. The image capturing device 51 can be the same as that of the 14th example, and will not be repeated herein.

The foregoing description, for purpose of explanation, has been described with reference to specific embodiments and examples. It is to be noted that the foregoing Tables show different data of the different examples; however, the data of the different examples are obtained from experiments. The examples were chosen and described in order to best explain the principles of the disclosure and its practical applications, to thereby enable others skilled in the art to best utilize the disclosure and various examples with various modifications as are suited to the particular use contemplated. The examples depicted above and the appended drawings are exemplary and are not intended to be exhaustive or to limit the scope of the present disclosure to the precise forms disclosed. Many modifications and variations are possible in view of the above teachings.

What is claimed is:

1. A composite light blocking sheet, comprising:
   a first surface layer having a first opening and a first outer surface connected to the first opening;
   a second surface layer having a second opening and a second outer surface connected to the second opening, wherein the second opening is disposed corresponding to the first opening;
   an inside substrate layer disposed between the first surface layer and the second surface layer and connecting the first surface layer and the second surface layer, wherein the inside substrate layer has a substrate opening corresponding to the first opening and the second opening; and
   a central axis being coaxial with the first opening, the second opening and the substrate opening;
   wherein more than 95% of the first outer surface has a first gloss being GU1, more than 95% of the second outer surface has a second gloss being GU2, the first gloss GU1 is different from the second gloss GU2, each of the first gloss GU1 and the second gloss GU2 is determined by projecting a beam of a light source at 60 degrees onto each of the first outer surface and the second outer surface when assuming that a vertical direction with respect to each of the first outer surface and the second outer surface is 0 degrees, and the following conditions are satisfied:

$0\% < GU1 < 1.8\%$; and $2.0\% < GU2 < 9.0\%$.

2. The composite light blocking sheet of claim 1, wherein the inside substrate layer is a plastic material layer, and the first surface layer and the second surface layer are black carbon-containing layers.

3. The composite light blocking sheet of claim 2, wherein a thickness of the composite light blocking sheet is t, and the following condition is satisfied:

$5 \mu m < t < 50 \mu m$.

4. The composite light blocking sheet of claim 2, wherein a thickness of the inside substrate layer is d, a thickness of the composite light blocking sheet is t, and the following condition is satisfied:

$0.16 < d/t < 0.81$.

5. An imaging lens assembly, comprising:
   a barrel;
   an optical lens set; and
   the composite light blocking sheet of claim 1;
   wherein the optical lens set and the composite light blocking sheet are disposed in the barrel.

6. The imaging lens assembly of claim 5, wherein the optical lens set comprise at least two lens elements, and each of the two lens elements has an axial connecting surface for assembling with each other so as to align centers of the two lens elements;
   wherein the composite light blocking sheet is disposed between the two lens elements, and an outer diameter of the composite light blocking sheet is smaller than or equal to a minimum inner diameter of the axial connecting surface of each of the two lens elements.

7. The imaging lens assembly of claim 6, wherein each of the axial connecting surfaces is a conical surface.

8. The imaging lens assembly of claim 7, wherein an angle between each of the conical surfaces and the central axis is θ, and the following condition is satisfied:

$$0 \text{ degrees} < \theta < 40 \text{ degrees}.$$

9. The imaging lens assembly of claim 5, wherein the imaging lens assembly has an object-side end and an image-side end, and the first outer surface faces toward the object-side end.

10. The imaging lens assembly of claim 9, wherein a maximum outer diameter of the composite light blocking sheet is 1, a thickness of the composite light blocking sheet is t, and the following condition is satisfied:

$$1 < 1000 * t/\Phi < 50.$$

11. The imaging lens assembly of claim 5, wherein the composite light blocking sheet is an aperture stop of the imaging lens assembly.

12. The imaging lens assembly of claim 5, wherein a focal length of the imaging lens assembly is f, a diameter of the substrate opening is phi D, and the following condition is satisfied:

$$0.30 < f/phi\ D < 3.2.$$

13. An electronic device, comprising:
the imaging lens assembly of claim 5; and
an image sensor, wherein the image sensor is disposed on an image surface of the imaging lens assembly.

14. A composite light blocking sheet, comprising:
a first surface layer having a first opening and a first outer surface connected to the first opening;
a second surface layer having a second opening and a second outer surface connected to the second opening, wherein the second opening is disposed corresponding to the first opening;
an inside substrate layer disposed between the first surface layer and the second surface layer and connecting the first surface layer and the second surface layer, wherein the inside substrate layer has a substrate opening corresponding to the first opening and the second opening; and
a central axis being coaxial with the first opening, the second opening and the substrate opening;
wherein more than 95% of the first outer surface has a first gloss being GU1, more than 95% of the second outer surface has a second gloss being GU2, the first gloss GU1 is different from the second gloss GU2, each of the first gloss GU1 and the second gloss GU2 is determined by projecting a beam of a light source at 60 degrees onto each of the first outer surface and the second outer surface when assuming that a vertical direction with respect to each of the first outer surface and the second outer surface is 0 degrees, and the following condition is satisfied:

$$2.0 < GU2/GU1 < 18.0.$$

15. The composite light blocking sheet of claim 14, wherein the inside substrate layer is a plastic material layer, and the first surface layer and the second surface layer are black carbon-containing layers.

16. The composite light blocking sheet of claim 15, wherein more than 95% of the first outer surface has the first gloss GU1, more than 95% of the second outer surface has the second gloss GU2, and the following conditions are satisfied:

$$0\% < GU1 < 1.8\%;\ \text{and}$$

$$2.0\% < GU2 < 9.0\%.$$

17. An imaging lens assembly, comprising:
a barrel;
an optical lens set; and
the composite light blocking sheet of claim 14;
wherein the optical lens set and the composite light blocking sheet are disposed in the barrel.

18. The imaging lens assembly of claim 17, wherein the barrel has a minimum opening, and a diameter of the substrate opening is smaller than a diameter of the minimum opening of the barrel.

19. The imaging lens assembly of claim 17, wherein the composite light blocking sheet is an aperture stop of the imaging lens assembly.

20. The imaging lens assembly of claim 17, wherein the imaging lens assembly has an object-side end and an image-side end, and the first outer surface faces toward the object-side end.

21. The imaging lens assembly of claim 20, wherein a maximum outer diameter of the composite light blocking sheet is 1, a thickness of the composite light blocking sheet is t, and the following condition is satisfied:

$$1 < 1000 t/\Phi < 50.$$

22. The imaging lens assembly of claim 17, wherein the optical lens set comprises at least two lens elements, a distance on the central axis between the two lens elements is CT, a thickness of the composite light blocking sheet is t, and the following condition is satisfied:

$$0.5 < CT/t < 35.0.$$

23. The imaging lens assembly of claim 22, wherein the distance on the central axis between the two lens elements is CT, the thickness of the composite light blocking sheet is t, and the following condition is satisfied:

$$2.0 < CT/t < 25.0.$$

24. The imaging lens assembly of claim 17, wherein the optical lens set comprise at least two lens elements, and each of the two lens elements has an axial connecting surface for assembling with each other so as to align centers of the two lens elements;
wherein the composite light blocking sheet is disposed between the two lens elements, and an outer diameter of the composite light blocking sheet is smaller than or equal to a minimum inner diameter of each of the axial connecting surfaces.

25. An electronic device, comprising:
the imaging lens assembly of claim 17; and
an image sensor, wherein the image sensor is disposed on an image surface of the imaging lens assembly.

* * * * *